(12) United States Patent
Jodlauk et al.

(10) Patent No.: US 10,075,511 B2
(45) Date of Patent: *Sep. 11, 2018

(54) INTERWORKING FOR GEOGRAPHICALLY TARGETED DISTRIBUTION OF APPLICATION SERVICE MESSAGES VIA AD-HOC NETWORK

(71) Applicant: Telefonaktiebolaget LM Ericsson (publ), Stockholm (SE)

(72) Inventors: Gordian Jodlauk, Würselen (DE); Branko Djordjevic, Herzogenrath (DE); Rene Rembarz, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 174 days.

This patent is subject to a terminal disclaimer.

(21) Appl. No.: 15/031,490

(22) PCT Filed: Nov. 5, 2013

(86) PCT No.: PCT/EP2013/073081
§ 371 (c)(1),
(2) Date: Apr. 22, 2016

(87) PCT Pub. No.: WO2015/067303
PCT Pub. Date: May 14, 2015

(65) Prior Publication Data
US 2016/0285960 A1  Sep. 29, 2016

(51) Int. Cl.
*H04L 29/08* (2006.01)
*H04L 29/06* (2006.01)
(Continued)

(52) U.S. Cl.
CPC ............. *H04L 67/10* (2013.01); *H04L 67/18* (2013.01); *H04L 67/42* (2013.01); *H04W 4/02* (2013.01); *H04W 4/12* (2013.01); *H04W 84/18* (2013.01)

(58) Field of Classification Search
CPC ......... H04L 65/40; H04L 67/18; H04L 67/10; H04L 67/42; H04W 4/02; H04W 4/12;
(Continued)

(56) References Cited

U.S. PATENT DOCUMENTS

| 8,768,603 B2 * | 7/2014 | Foti | G08G 1/096775 701/117 |
| 2010/0217615 A1 * | 8/2010 | Brown | H04L 67/24 705/1.1 |

(Continued)

FOREIGN PATENT DOCUMENTS

| JP | 2013-524691 A | 6/2013 |
| WO | WO 2012/055433 A1 | 5/2012 |

(Continued)

OTHER PUBLICATIONS

International Search Report and Written Opinion of the International Searching Authority, Application No. PCT/EP2013/073081, dated Aug. 22, 2014.
(Continued)

Primary Examiner — Ruolei Zong
(74) Attorney, Agent, or Firm — Sage Patent Group

(57) ABSTRACT

A distribution server for geographically targeted message distribution to a client is used for providing an application service, in particular a vehicular traffic related application service, such as a Cooperative Intelligent Transport System (C-ITS) service. An interworking device connects, e.g., via a cellular network connection, to the distribution server. Further, the interworking device connects via an ad-hoc network connection to the client. On behalf of the client, the interworking device performs registration for the application service at the distribution server. On the basis of the registration, the interworking device forwards at least one message of the application service between the distribution server and the client.

35 Claims, 18 Drawing Sheets

(51) Int. Cl.
*H04W 4/02* (2018.01)
*H04W 4/12* (2009.01)
*H04W 84/18* (2009.01)

(58) Field of Classification Search
CPC ....... H04W 4/021; H04W 4/18; H04W 64/00; H04W 84/18
USPC .......................................................... 709/204
See application file for complete search history.

(56) References Cited

U.S. PATENT DOCUMENTS

| | | | | |
|---|---|---|---|---|
| 2010/0228845 | A1* | 9/2010 | Choi | H04W 36/385 709/223 |
| 2013/0311547 | A1* | 11/2013 | Foti | H04L 51/20 709/203 |
| 2013/0325305 | A1* | 12/2013 | Foti | G08G 1/096775 701/117 |
| 2014/0198641 | A1* | 7/2014 | Perkuhn | H04W 4/18 370/230 |
| 2015/0189615 | A1* | 7/2015 | Rembarz | H04W 4/021 455/435.1 |

FOREIGN PATENT DOCUMENTS

| | | |
|---|---|---|
| WO | WO 2012/159684 A1 | 11/2012 |
| WO | WO 2013/053388 A1 | 4/2013 |
| WO | WO 2013/189974 A2 | 6/2013 |

OTHER PUBLICATIONS

Car 2 Car Communication Consortium, "Experiencing the mobility of the future—Successful Demonstration of Cooperative Mobility at ITS World Congress" (Demo at WC 212) downloaded Oct. 28, 2013 from http://www.car-2-car.org/index.php?id=217, 2 pp.

Car 2 Car Communication Consortium, Press Release—European vehicle manufacturers working hand in hand on deployment of cooperative Intelligent Transport Systems and Services (C-ITS), Oct. 10, 2012, downloaded from http://cvt-project.ir/Admin/Files/eventAttachments/Car2Car%20Consortium_%20MOU_327.pdf, 2 pp.

ETSI, Technical Specification—"Geomessaging Enabler", TS 103 084 V<0.0.3> (<Oct. 2013>), 47 pp.

Festag, Presentation—"Geocasting over 11p, LTE and beyond", *4th ETSI TC ITS Workshop*, Doha, Qatar, Feb. 7-9, 2012, 11 pp.

Jodlauk et al., "An Optimized Grid-Based Geocasting Method for Cellular Mobile Networks", *Proceedings of the 18th ITS World Congress*, Orlando, Florida, Oct. 16-20, 2011, 12 pp.

Office of the Assistant Secretary for Research and Technology (OST-R), U.S. Department of Transportation (US DOT), "RITA—Intelligent Transportation Systems—Safety Pilot", downloaded Oct. 24, 2013 from http://www.its.dot.gov/safety_pilot.htm, 9 pp.

* cited by examiner

INTERWORKING FOR GEOGRAPHICALLY TARGETED DISTRIBUTION OF APPLICATION SERVICE MESSAGES VIA AD-HOC NETWORK

CROSS REFERENCE TO RELATED APPLICATION

This application is a 35 U.S.C. § 371 national stage application of PCT International Application No. PCT/EP2013/073081, filed on Nov. 5, 2013, the disclosure and content of which is incorporated by reference herein in its entirety. The above-referenced PCT International Application was published in the English language as International Publication No. WO 2015/067303 A1 on May 14, 2015.

TECHNICAL FIELD

The present invention relates to methods for geographically targeted distribution of application service messages via ad-hoc network and to corresponding devices.

BACKGROUND

In the context of Cooperative Intelligent Transport Systems (C-ITS) applications, ETSI TS 103 084 V0.0.3 "Geomessaging Enabler" suggests to use a geographically targeted distribution mechanism referred to as Geomessaging (GM). As described in "An Optimized Grid-Based Geocasting Method for Cellular Mobile Networks" by G. Jodlauk et al., ITS World Congress 2011, Orlando, USA, October 2011, and in WO 2012/055433 A1, this concept involves a GM server which tracks the position of GM clients using a grid-based scheme. GM clients notify the GM server when they move to another field of the grid, which allows the GM server to continuously update a mapping of GM clients to grid areas. Based on this mapping, the GM server can serve distribution requests by different application servers and forward messages in nearly real-time to GM clients in a designated geographic area, which in turn provide the messages further to their associated application clients.

A further known way for implementing the above-mentioned C-ITS applications is to use ad-hoc networks, in particular a Wireless Local Area Network according to the IEEE 802.11p standard. Using such ad-hoc network, the C-ITS application in a vehicle may communicate directly with the C-ITS application in another vehicle, without requiring usage of a centralized C-ITS server. When using an ad-hoc network for implementing C-ITS applications geographic targeting of message distribution is typically inherent, because only receivers within limited range from the sender will be able to receive messages from the sender. On the other hand, usage of cellular communication for C-ITS applications allows for covering larger areas and does not require dedicated road side infrastructure, but typically requires additional infrastructure to support targeting of selected geographical areas, such as the above-mentioned GM mechanism.

Further, in "Geocasting over 11p, LTE and beyond", A. Festag, 4th ETSI TC ITS Workshop, February 2012, Doha, Quatar, also a hybrid system is suggested which combines both cellular communication using the LTE (Long Term Evolution) radio technology specified by 3GPP (3rd Generation Partnership Project) and ad-hoc network communication using the ITS-G5 radio technology. In this case, a vehicle station is connected to a server via the cellular LTE radio technology and may forward messages to or from other vehicle stations via the ad-hoc ITS-G5 radio technology. However, this hybrid system may have problems concerning the efficiency of message distribution over the cellular network. For example, to be sure that the vehicle stations connected over the ITS-G5 radio technology are provided with all relevant messages, all potentially relevant messages need to be provided to the vehicle station connected via the LTE radio technology. However, it may occur that some of these messages are actually not relevant for the vehicle stations and have been unnecessarily transmitted. This means that resources of the LTE radio technology are not efficiently utilized, which is undesirable from a cost perspective and from a network capacity perspective.

Accordingly, there is a need for techniques which allow for efficiently performing geographically targeted distribution of application service messages.

SUMMARY

According to an embodiment of the invention, a method for providing an application service through a distribution server for geographically targeted message distribution to a client is provided. According to the method, an interworking device connects, e.g., via a cellular network connection, to the distribution server. Further, the interworking device connects via an ad-hoc network connection to the client. On behalf of the client, the interworking device performs registration for the application service at the distribution server. On the basis of the registration, the interworking device forwards at least one message of the application service between the distribution server and the client.

According to a further embodiment of the invention, a method for providing an application service through a distribution server for geographically targeted message distribution to a client is provided. According to the method, the client connects to the distribution server and performs registration for the application service at the distribution server. This is accomplished via a first network connection, e.g., a cellular network connection. Further, the client connects via an ad-hoc network connection to an interworking device. The interworking device configured to register for the application service at the distribution server on behalf of the client. The interworking device is configured to accomplish this registration via a second network connection, e.g., a further cellular network connection. Via the first network connection, the client sends an indication to the distribution server for controlling the distribution server to pause distribution of messages of the application service via the first network connection to the client.

According to a further embodiment of the invention, a method for providing an application service through a distribution server for geographically targeted message distribution to a client is provided. According to the method, the distribution server connects to the client and performs registration of the client for the application service. This is accomplished via a first network connection. Further, the distribution server connects via a second network connection to an interworking device and registers the interworking device on behalf of the client for the application service. The first network connection may for example be a cellular network connection, and the second network connection may for example be a further cellular network connection. The interworking device provides an ad-hoc network connection to the client. Via the first network connection, the distribution server receives an indication from the client. In response to the indication, the distribution server pauses distribution of messages of the application service via the first network connection to the client.

According to a further embodiment of the invention, a device for providing an application service through a distribution server for geographically targeted message distribution to a client is provided. The device comprises a first interface, e.g., a cellular network interface, for connecting to the distribution server. Further, the device comprises a second interface for connecting via an ad-hoc network connection to the client. Further, the device comprises at least one processor. The at least one processor is configured to connect to the distribution server. Further, the at least one processor is configured to connect via the ad-hoc network to the client. Further, the at least one processor is configured to perform registration for the application service at the distribution server on behalf of the client. Further, the at least one processor is configured to forward, on the basis of the registration, at least one message of the application service between the client and the distribution server.

According to a further embodiment of the invention, a device for implementing a client for providing an application service through a distribution server for geographically targeted message distribution to the client is provided. The device comprises a first interface for connecting via a first network connection to the distribution server. The first network connection may for example be a cellular network connection. Further, the device comprises a second interface for connecting via an ad-hoc network connection to an interworking device. Further, the device comprises at least one processor. The at least one processor is configured to connect via the first network connection to the distribution server and perform registration for the application service at the distribution server via the first network connection. Further, the at least one processor is configured to connect via the ad-hoc network connection to the interworking device, which is configured to register for the application service at the distribution server on behalf of the client. The interworking device is configured to accomplish this registration via a second network connection, e.g., a further cellular network connection. Further, the at least one processor is configured to send, via the first network connection, an indication to the distribution server for controlling the distribution server to pause distribution of messages of the application service via the first network connection to the client.

According to a further embodiment of the invention, a device for implementing a distribution server for geographically targeted distribution of messages of an application service to a client is provided. The device comprises at least one interface for connecting via a first network connection to a client and for connecting via a second network connection to an interworking device which provides an ad-hoc network connection to the client. The first network connection may for example be a cellular network connection, and the second network connection may for example be a further cellular network connection. Further, device comprises at least one processor. The at least one processor is configured to connect via the first network connection to the client and to perform registration of the client for the application service via the first network connection. Further, the at least one processor is configured to connect via the second network connection to the interworking device, which provides the ad-hoc network connection to the client. Further, the at least one processor is configured to perform registration of the interworking device for the application service on behalf of the client via the second network connection. Further, the at least one processor is configured to receive an indication from the client via the first network connection and, in response to the indication, pause distribution of messages of the application service via the first network connection to the client.

According to a further embodiment of the invention, a computer program or computer program product, e.g., in the form of a non-transitory storage medium, is provided, which comprises program code to be executed by at least one processor of a device for geographically targeted distribution of messages of an application service to a client. Execution of the program code causes the at least one processor to connect to the distribution server, e.g., via a cellular network connection. Further, execution of the program code causes the at least one processor to connect via an ad-hoc network connection to the client. Further, execution of the program code causes the at least one processor to perform registration for the application service on behalf of the client at the distribution server. Further, execution of the program code causes the at least one processor to forward, on the basis of the registration, at least one message of the application service between the client and the distribution server.

According to a further embodiment of the invention, a computer program or computer program product, e.g., in the form of a non-transitory storage medium, is provided, which comprises program code to be executed by at least one processor of a device for geographically targeted distribution of messages of an application service to a client. Execution of the program code causes the at least one processor to connect via a first network connection to the distribution server and perform registration at the distribution server for the application service via the first network connection. The first network connection may for example be a cellular network connection. Further, execution of the program code causes the at least one processor to connect via the ad-hoc network connection to an interworking device which is configured to register at the distribution server for the application service on behalf of the client. The interworking device is configured to accomplish this registration via a second network connection, e.g., a further cellular network connection. Further, execution of the program code causes the at least one processor to send, via the first network connection, an indication to the distribution server for controlling the distribution server to pause distribution of messages of the application service via the first network connection to the client.

According to a further embodiment of the invention, a computer program or computer program product, e.g., in the form of a non-transitory storage medium, is provided, which comprises program code to be executed by at least one processor of a device for geographically targeted distribution of messages of an application service to a client. Execution of the program code causes the at least one processor to connect via a first network connection to the client and to perform registration of the client for the application service via the first network connection. The first network connection may for example be a cellular network connection. Further, execution of the program code causes the at least one processor to connect via a second network connection to an interworking device which provides the ad-hoc network connection to the client and to perform registration of the interworking device for the application service on behalf of the client via the second network connection. The second network connection may for example be a further cellular network connection. Further, execution of the program code causes the at least one processor to receive an indication from the client via the first network connection and, in response to the indication, pause distribution of messages of the application service via the first network connection to the client.

DETAILED DESCRIPTION OF EMBODIMENTS

Figure 1:
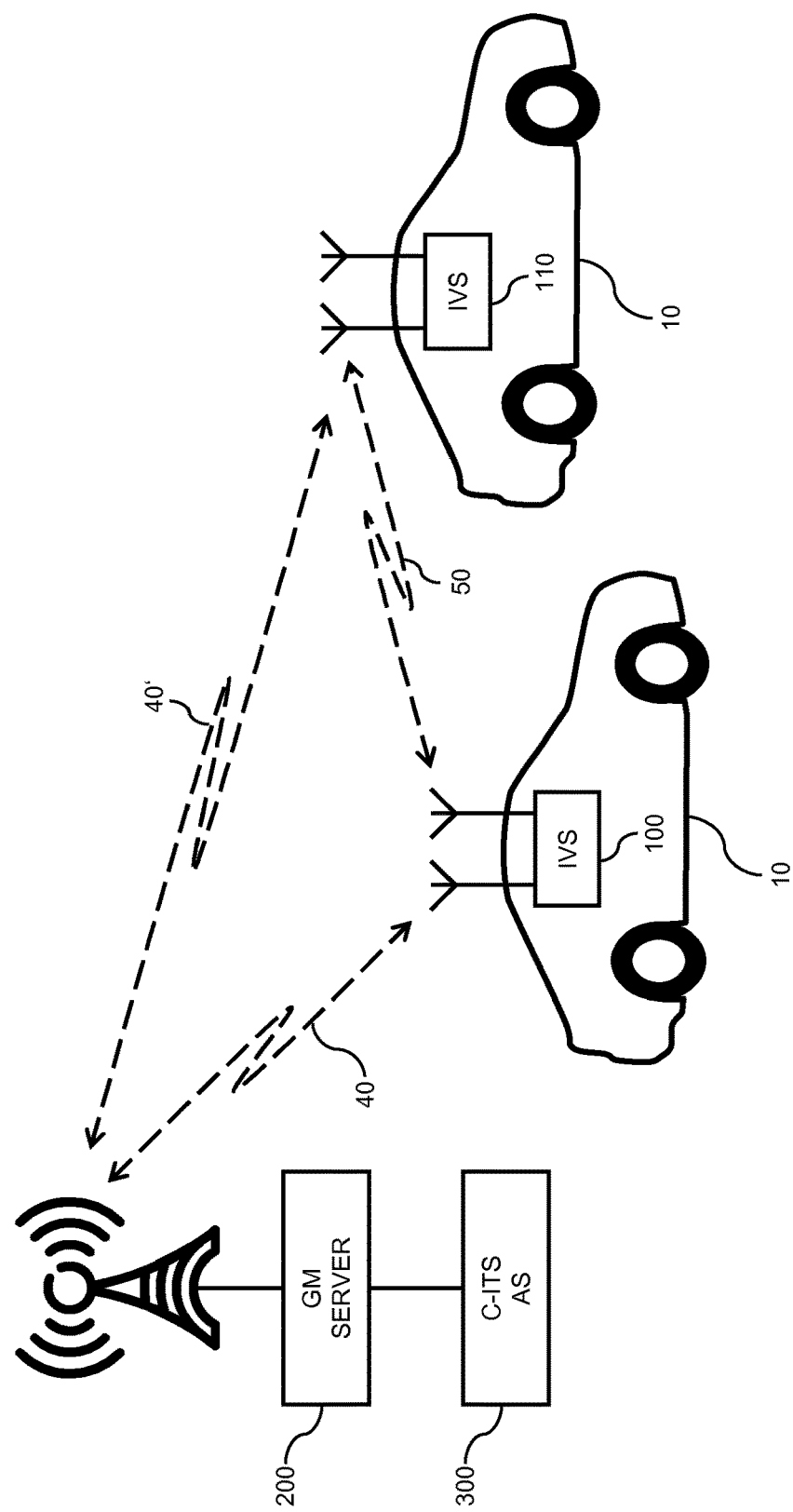
FIG. 1 schematically illustrates scenario according to an embodiment of the invention, in which messages are distributed via a GM server to vehicle based clients.

In the following, concepts according to embodiments of the invention will be explained in more detail by referring to the accompanying drawings. The illustrated concepts relate to geographically targeted distribution of messages of an application service via a correspondingly configured server and an ad-hoc network connection to a client, typically located in a vehicle. Further, also an Internet Protocol (IP) based network connection to the client may be utilized. In the illustrated examples, the IP based network connection is assumed to be a cellular network connection. However, in it is to be understood that the IP based connection could also be another kind of wireless connection or a wired connection. The ad-hoc network connection may for example be based on the IEEE 802.11p or ITS-G5 radio technology. The cellular network connection may for example be provided by a 3GPP network, e.g., using LTE radio access technology. However it should be understood that other cellular network technologies, such as GSM (Global System for Mobile communication), UMTS (Universal Terrestrial Mobile Telecommunications System), CDMA2000, and/or other ad-hoc network technologies, such as LTE Device-to-Device (D2D), could be used as well.

In the illustrated examples, the application service is assumed to be a vehicular traffic related application service, in particular a C-ITS service. Nonetheless, the illustrated concepts are not limited to C-ITS services and could also be applied to any other application service that requires location-dependent delivery, such as an information service for fuel prices. The server which coordinates the geographically targeted distribution of messages is assumed to be a GM server which implements functionalities of a GM enabler as described in ETSI TS 103 084. However, other implementations of the server could be utilized as well. The message distribution by the GM server is assumed utilize a grid-based scheme, as described in ETSI TS 103 084 and WO 2012/055433 A1.

In the illustrated concepts, an interworking device is used for allowing to also use ad-hoc network connections between the GM server to clients. That is to say, a client may connect via an ad-hoc network connection to the interworking device which is connected to the GM server via a cellular network connection or other connection providing IP based data connectivity. The interworking device may be located in a vehicle or in a roadside station, the latter location allowing to also utilize a wired connection to the GM server.

In view of efficient message distribution, the interworking device registers for the application service at the GM server. This is done on behalf of the client, i.e., considering the requirements of the client. This allows the interworking device to keep the GM server informed about the client, e.g., with respect to the identity of the specific C-ITS application service(s) utilized by the client and/or with respect to the location of the client, or the like. The GM server may in turn utilize this information when deciding which messages should be distributed to the interworking device.

FIG. 1 schematically illustrates application of the concepts in an exemplary scenario. The scenario of FIG. 1 shows message distribution from an application server (AS), in particular a C-ITS AS 300, via a GM server 200 to vehicle stations 100, 110 in vehicles 10. The vehicle stations 100, 110 implement a C-ITS client application and will therefore in the following also be referred to as "client". In accordance with the illustrated C-ITS scenario, the vehicle stations 100, 110 are labeled as ITS vehicle station (IVS). Depending on the specific C-ITS application, the C-ITS 300 may for example generate and send messages to the vehicle stations 100, 110 and/or terminate messages received from the vehicle stations 100, 110. Further, the C-ITS 300 may also relay messages between the vehicle stations 100, 110. The C-ITS 300 may also support multiple C-ITS applications in parallel.

Both vehicle stations 100, 110 are assumed to be equipped with a first radio interface for connecting to a cellular network, in the following referred to as cellular network interface, and a second radio interface for connecting to an ad-hoc network, in the following referred to as ad-hoc network interface. As mentioned above, the cellular network may for example use the LTE radio access technology or some other cellular radio technology, e.g., GSM, UMTS, or CDMA2000, and the ad-hoc network may for example use the IEEE 802.11p radio technology or LTE D2D.

In the illustrated scenario, the vehicle station 100 is connected via a cellular network connection 40 to the GM server 200. The vehicle station 110 is connected via an ad-hoc network connection 50 to the vehicle station 100, which acts as an interworking device for connecting the vehicle station 110 to the GM server 200. In addition, FIG. 1 also illustrates a further cellular network connection 40' which may be established by the vehicle station 110 for connecting to the GM server 200. The further cellular network connection 40' may be utilized by the vehicle station 110 when the ad-hoc network connection 50 is not available or in addition to the ad-hoc network connection 50. Utilizing the ad-hoc network connection 50 in parallel to the cellular network connection 40' allows for reducing the load on the cellular network. As will be further explained in the following, the concepts illustrated herein allow the vehicle stations 100, 110 to efficiently utilize two different distribution paths, one being based on connectivity via the cellular network to the GM server 200, the other being based on ad-hoc network connectivity to another vehicle station 100, 110, which acts as the interworking device. In the following, specific use cases will be described in more detail from the perspective of the vehicle station 110.

Figure 2:
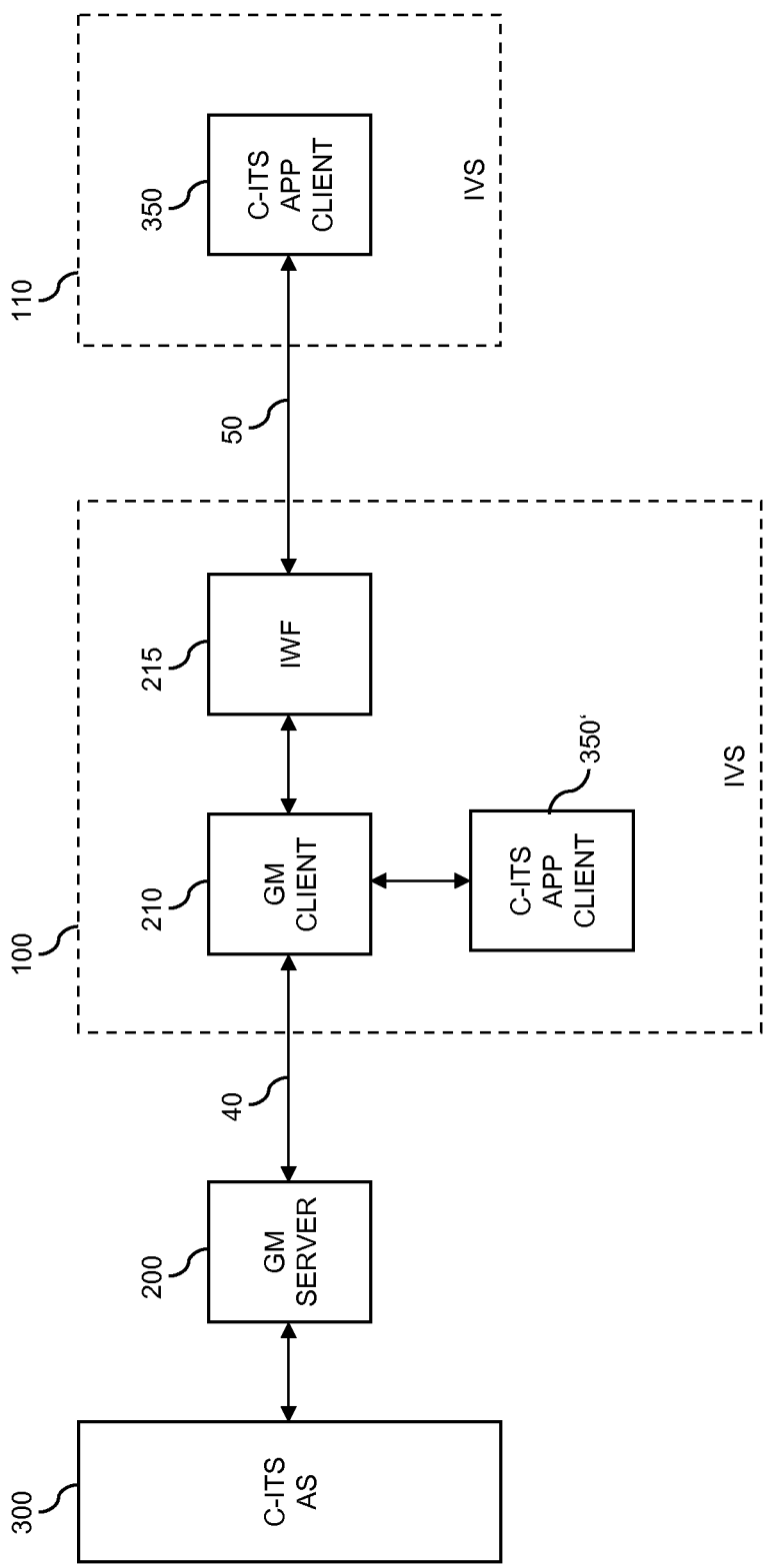
FIG. 2 schematically illustrates a use case corresponding to the scenario of FIG. 1, in which messages between the GM server and a vehicle based client are forwarded by an interworking device located in a vehicle.

FIG. 2 illustrates a use case which is based on the scenario of FIG. 1 and involves the C-ITS AS 300, the GM server 200, the vehicle station 100, and the vehicle station 110. In the use case of FIG. 2, the vehicle station 100 acts as the interworking device which connects a C-ITS application client 350 in the vehicle station 110 via the GM server 200 to the C-ITS AS 300. For this purpose, the vehicle station 100 is provided with a GM client 210 and an interworking function (IWF) 215. As further illustrated, the vehicle station 100 may also be provided with a C-ITS application client 350'. In the use case of FIG. 2, the vehicle station 110 acts as a bridge between an IP based network domain with the C-ITS AS 300 and the GM server 200 and the ad-hoc network domain with the vehicle station 110. In some scenarios, the cellular network connection 40 could also be replaced by another kind of wireless connection providing IP based data connectivity to the vehicle station 100. In the use case of FIG. 2, the vehicle station 100 may for example be used for efficiently disseminating warnings about an accident to other vehicles 10 within the ad-hoc network coverage region of the vehicle station 100. For example, the vehicle station 100 could be located in a police vehicle or other emergency vehicle.

Figure 3:
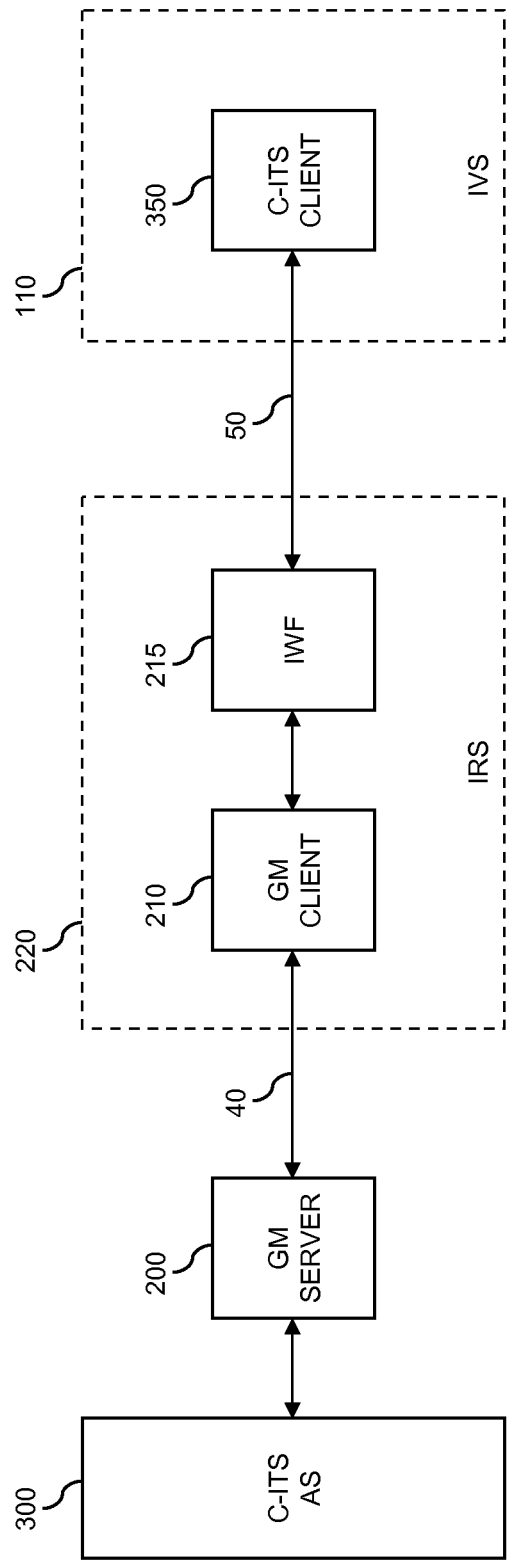
FIG. 3 schematically illustrates a further use case according to an embodiment of the invention, in which messages between the GM server and a vehicle based client are forwarded by an interworking device located in a roadside station.

FIG. 3 illustrates a further use case which is generally similar to that of FIG. 2, but assumes that a roadside station 20, in accordance with the illustrated C-ITS scenario labeled as IRS (ITS Roadside Station), acts as the interworking device connecting the C-ITS application client 350 in the vehicle station 110 to via the GM server 200 to the C-ITS AS 300. Similar to the vehicle station 100 of FIG. 2, the roadside station 20 is provided with a GM client 210 and an IWF 215. The roadside station 20 may be used for efficiently relaying messages between the IP based network domain with the C-ITS AS 300 and the GM server 200 and the ad-hoc network domain with the vehicle station 110. In some scenarios, the cellular network connection 40 could also be replaced by another kind of wireless connection providing IP based data connectivity. In the case of the interworking device being implemented by a roadside station, such as in the use case of FIG. 3, also a wired connection could be used between the GM server 200 and the roadside station, rather than the cellular network connection 40, for providing IP based data connectivity to the roadside station.

Figure 4:
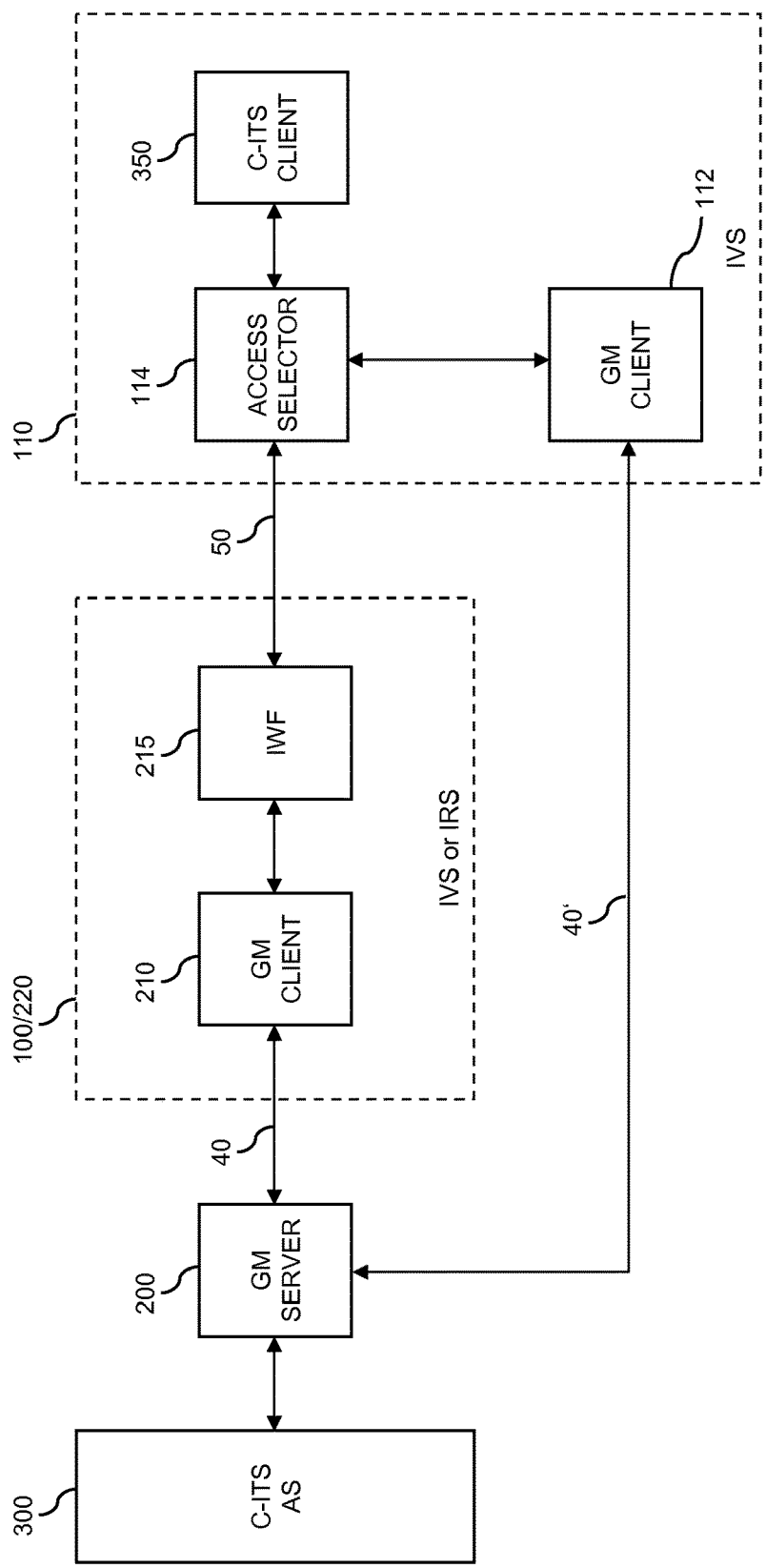
FIG. 4 schematically illustrates a further use case according to an embodiment of the invention, in which the vehicle based client may select between an access in which the messages are forwarded by the interworking device and an access using a cellular network connection to the GM server.

A still further use case is illustrated in FIG. 4. The use case of FIG. 4 may be based on the use case of FIG. 2 or on the use case of FIG. 3, i.e., the interworking device may be implemented by a vehicle station or by a roadside station. In the use case of FIG. 4, it is assumed that the vehicle station 110 is further implemented with a GM client 112 for directly interacting with the GM server 200, and an access selector 114 which allows for selecting the ad-hoc network connection 50 to the interworking device or the cellular network connection 40' for connecting via GM client 112 and the GM server 200 to the C-ITS AS 300. In some implementations, the access selector 114 may also allow for using both the ad-hoc network connection and the cellular network connection 40' in parallel. In the use case of FIG. 4, the vehicle station 110 may for example choose to route certain message types associated with high traffic volume over the ad-hoc network domain, thereby saving resources on the cellular network connection 40'. As further explained below, in the use case of FIG. 4 the GM client 112 may control the GM server 200 to pause or resume distribution of messages via the cellular network connection 40'.

Figure 5:
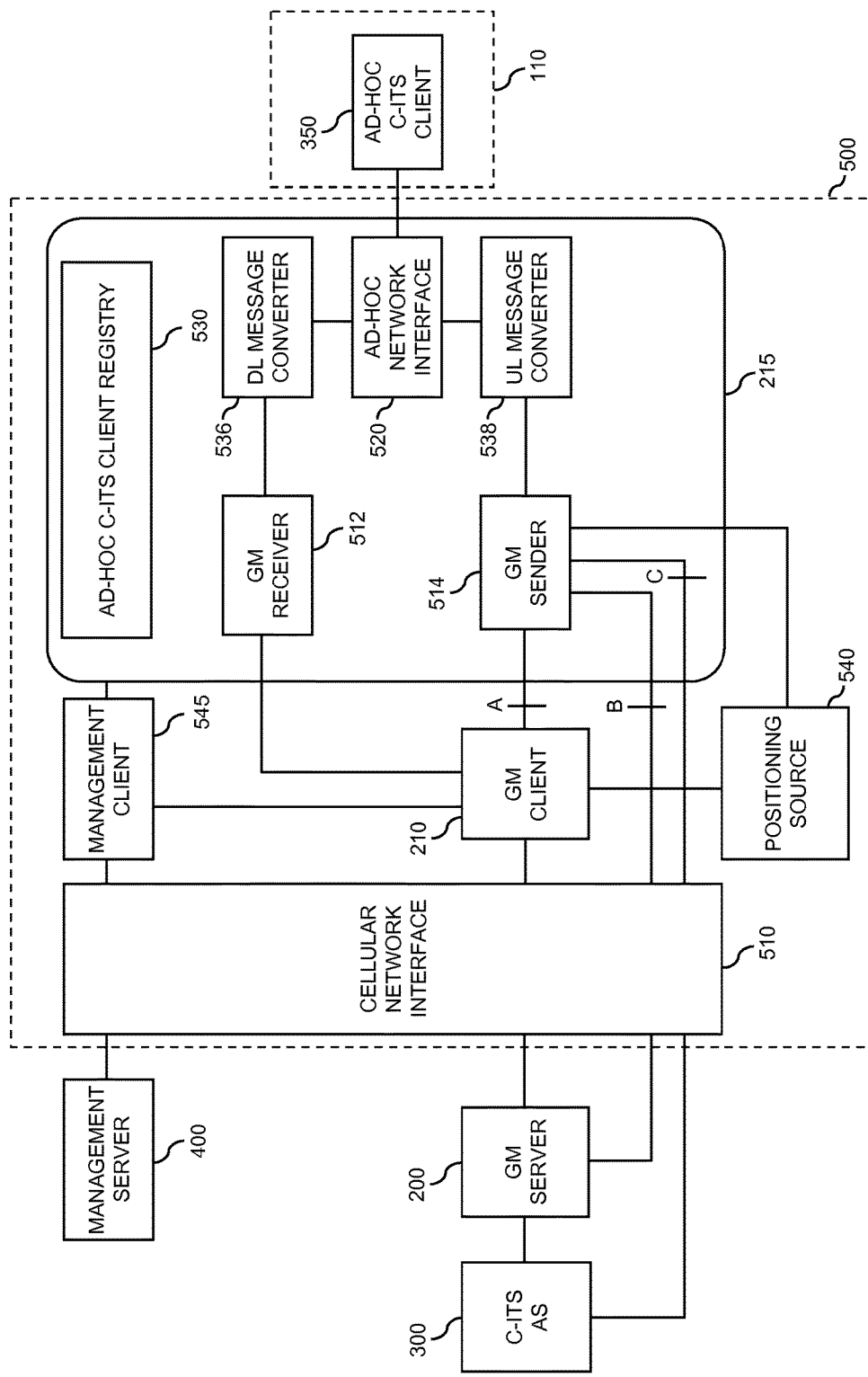
FIG. 5 shows a block diagram for schematically illustrating functionalities of an interworking device according to an embodiment of the invention.

FIG. 5 schematically illustrates functionalities of an interworking device 500 for implementing the above concepts. As mentioned above, the interworking device 500 may be located in a vehicle 10, such as when being implemented by the vehicle station 100, or in a roadside station 20. As illustrated, the interworking device 500 is provided with a cellular network interface 510 and with an ad-hoc network interface 520. The cellular network interface 510 allows for connecting the interworking device 500 via the cellular network connection 40 to the GM server 200 and to the C-ITS AS 300. The ad-hoc network interface 520 allows for connecting the interworking device 500 via the ad-hoc network connection to one or more clients, such as the vehicle station 110 with the C-ITS application client 350. For interaction with the GM server 200, the interworking device 500 is provided with the GM client 210. The IWF 215 is provided for adaption of the GM messaging functionalities and the ad-hoc network messaging functionalities. Towards the GM client 210, the IWF acts 215 acts as a C-ITS application client, e.g., using the Gcv interface as specified in ETS TS 103 084. For this purpose, the IWF 215 is provided with a correspondingly configured GM receiver 512 and a correspondingly configured GM sender 514. With respect to the ad-hoc network interface 520, the IWF 215 operates as a IEEE 802.11p C-ITS peer. As further illustrated, the interworking device 500 may be provided with a positioning source 540, such as a GPS (Global Positioning System) or other satellite positioning device, to provide information on the geographical location of the interworking device 500. The geographical location of the interworking device 500 may also be used as an estimate of the geographical position of clients connected via the ad-hoc network interface 520. Further, the interworking device 500 may be provided with a management client 545, which allows for configuration of the interworking device 500 through a management server 400.

The functionalities of the IWF 215 include an ad-hoc C-ITS client registry 530, which is responsible for maintaining a list of ad-hoc C-ITS clients 350 connected via the ad-hoc network interface 520 and to keep relevant information for handling corresponding registration via the GM client 210 at the GM server 200. For example, the ad-hoc C-ITS client registry 530 may keep information on the identity of C-ITS applications implemented by a certain C-ITS client 350 connected via the ad-hoc network interface 520. Such information may be indicated by the C-ITS client 350 when establishing the ad-hoc network connection or may be derived by the IWF 215 from messages transmitted by the C-ITS client 350. Further, the ad-hoc C-ITS client registry 530 may keep information on the geographical location of the C-ITS client connected via the ad-hoc network interface 520. Such information may be derived by the IWF 215 from messages transmitted by the C-ITS client 350. Alternatively, the geographical location of the interworking device 500 as indicated by the positioning source 540 could be used as an estimate for the geographical location of the C-ITS client 350.

By using the information from the ad-hoc C-ITS client registry 530, the IWF 215 may perform registration via the GM client 210 at the GM server 200, so that relevant messages transmitted via the GM server towards C-ITS application clients 350 are received and can be forwarded to the C-ITS client(s) 350 connected via the ad-hoc network interface 520. Further, the IWF 215 may use the information from the ad-hoc C-ITS client registry 530 for suitably generating corresponding messages to be sent via the GM client 210 to the GM server 200, e.g., by including a corresponding service identifier into the messages.

For conversion of downlink (DL) messages from the GM server 200 into messages sent via the ad-hoc network interface 520, the IWF 215 includes a DL message converter 536 which operates to convert the DL messages from the GM format to the format used in the ad-hoc network. In the illustrated example, the DL messages are received from the GM server 200 using IP based communication, where the network layer uses IP addresses as a means of specifying the destination. Geographical destination information is contained in the payload of the C-ITS messages. The format used in the ad-hoc network is turn assumed to require a geographical destination in the network layer. In the illustrated example embodiment, the DL message converter 536 is responsible for extracting the geographical destination address from the payload of the C-ITS message and inserting it into the message transmitted towards the ad-hoc network. The corresponding protocol and address translation is further illustrated in FIG. 6.

For conversion of uplink (UL) messages from the C-ITS application client(s) connected via the ad-hoc network interface 520 into messages sent via the GM client 210 to the GM server 200, the IWF 215 includes a UL message converter 538 which operates to convert the UL messages from the format used in the ad-hoc network to the GM format. In the illustrated example, the format used in the ad-hoc network indicates a geographic destination in the destination field of the networking layer. This information is extracted by the UL message converter 538 from the UL message and forwarded to the GM server 200 residing in the IP domain along with the complete, unmodified message. The destination addresses in the IP domain may be known to the UL message converter 538 via a local configuration or via remote configuration from the network. The corresponding protocol and address translation is further illustrated in FIG. 7. In some implementation, the IWF 215 may also perform aggregation and/or filtering of the UL messages received via the ad-hoc network interface 520 before sending corresponding UL messages via the GM client 210 to the GM server 200. The handling of the DL messages will now be further explained by referring to exemplary message formats as illustrated in FIG. 6.

As mentioned above, the DL messages are received by the interworking device 500 via the cellular network interface 510 and the GM client 210. This is accomplished according to the registration performed on the basis of the information from the ad-hoc C-ITS client registry 530, which allows for receiving only messages relevant to the C-ITS application client(s) 350 connected via the ad-hoc network interface 520 or messages which are relevant to a local C-ITS application client in the interworking device 500, such as the C-ITS application client 350' in FIG. 2. From the GM client 210, the DL messages are provided to the GM receiver 512 and to the DL message converter 536, which converts the DL messages from the GM format to the format as used in the ad-hoc network.

Figure 6:
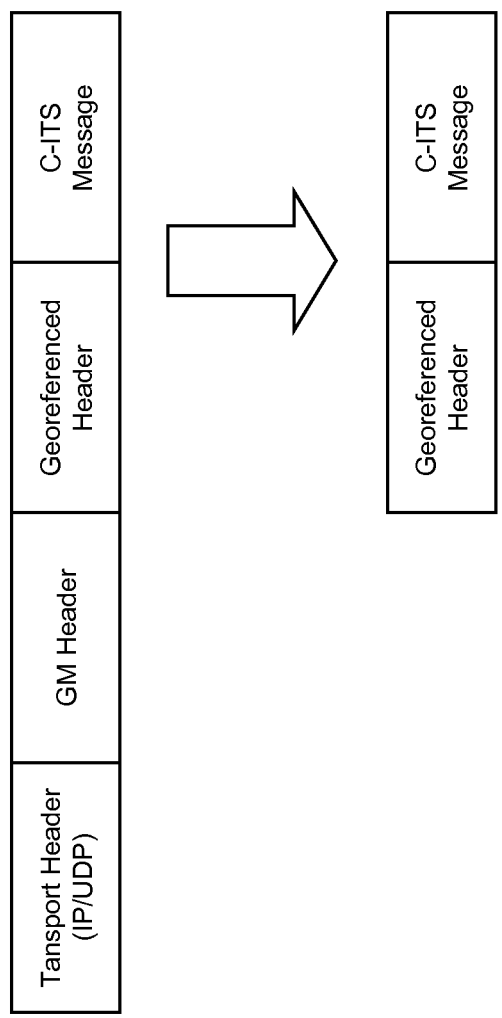
FIG. 6 schematically illustrates conversion of downlink messages by the interworking device.

The GM format is schematically illustrated in the upper part of FIG. 6. As illustrated, the GM format includes a transport header, e.g., an IP/UDP (User Datagram Protocol) header, a GM header, a georeferenced header, and the actual C-ITS message. The transport header includes addressing information for routing the DL message from the GM server 200 to the GM client. Unicast or broadcast addresses may be used in the transport header. The GM header includes information specific to the GM protocol, e.g., a service identifier specifying the service to which the DL message relates. The georeferenced header specifies a geographical region to which the DL message relates so that the C-ITS client receiving the DL message can decide whether it is relevant or not. The actual C-ITS message constitutes the payload of the DL message, and may for example be a CAM (Cooperative Awareness Message) or a DENM (Decentralized Environmental Notification Message).

The GM client 210, the GM receiver 512, and the DL message converter 536 operate to translate the DL messages into the format used by the ad-hoc network, as illustrated in the lower part of FIG. 6. In this process, the IP/UDP header is removed (by the GM client 210), and the GM header is removed (by the GM receiver 512), leaving a DL message which includes the georeferenced header and the actual C-ITS message.

Figure 7:
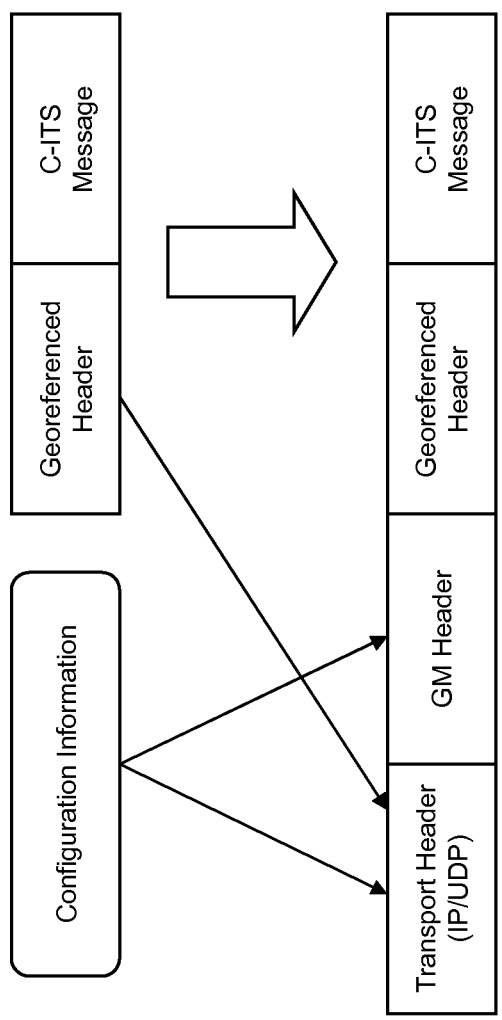
FIG. 7 schematically illustrates conversion of uplink messages by the interworking device.

The handling of the UL messages will now be further explained by referring to exemplary message formats as illustrated in FIG. 7.

As mentioned above, the UL messages are received by the interworking device 500 via the ad-hoc network interface 520, in a format as illustrated in the upper part of FIG. 7. As illustrated, this format includes the actual C-ITS message, e.g., a CAM or DENM, and a georeferenced header. The georeferenced header specifies a geographical region to which the C-ITS message relates so that the C-ITS client receiving the C-ITS message can decide whether it is relevant or not. By analyzing the type of the C-ITS message, e.g., whether it is a CAM or DENM, the UL message converter can determine a corresponding service identifier to be included into the GM header of the GM format. Further information for generating the GM header may be obtained from the C-ITS message itself or from information in the georeferenced header. Still further information for generating the GM header can be obtained from configuration information stored in the interworking device 500, such as provided through the management server 400 and the management client 545. Also the transport header of the UL messages sent from the interworking device 500 to the GM server 200 may be generated depending on such configuration information and included into the UL message by the GM client 210. The resulting UL message as sent by the GM client 210 toward the GM server 200 is illustrate in the lower part of FIG. 7.

In the implementation of FIG. 6, different options which are available for the GM sender 514 when sending a DL message: a first option indicated by path A from the GM sender 514, a second option indicated by path B from the GM sender 514, and a third option indicated by path C from the GM sender 514.

The first option corresponds to the GM sender 514 sending the UL message to the GM client 210. This may be accomplished using the above-mentioned Gcv interface specified between GM client and C-ITS application.

The second option corresponds to the GM sender 514 sending the UL message directly to the GM server 200, bypassing the GM client 210. In this case, the GM sender 514 determine a target area for dissemination of the UL message and indicate this target area in the GM header of the UL message to the GM server 200, so that the GM server 200 can distribute the message without involving the C-ITS AS 300. Accordingly, a GM dissemination capability of the GM sender 514 may be provided which is similar to a GM dissemination capability of the C-ITS AS 300. For implementing path B, it is therefore possible to utilize an interface which is similar to the Gse interface specified in ETSI TS 103 084 between C-ITS AS and GM server (also referred to as GM enabler). The GM sender 514 may determine the target area from information in the UL C-ITS message and/or information from the positioning source 540.

The third option corresponds to the GM sender 514 sending the UL message directly to the C-ITS AS 300, bypassing both the GM client 210 and the GM server 200. Also for implementing path C, an interface may be utilized which is similar to the Gse interface specified in ETSI TS 103 084 between C-ITS AS and GM server. Using the direct path C to the C-ITS AS 300 may be useful in cases where no dissemination of the UL message by the GM server 200 is needed, e.g., when providing certain information to be used by a centralized C-ITS application on the C-ITS AS 300. This option can be used as an alternative to the first option in cases where the additional processing at the GM server is not desirable, e.g., due to load or delay reasons, and the address of the C-ITS AS 300 is known at the interworking device 500.

As mentioned in connection with the use case of FIG. 4, the vehicle station 110 may be equipped with both the GM client 112 for interacting with the GM server 200 via the cellular network connection 40' and with an ad-hoc network interface for connecting to the interworking device 500. This may be used for offloading C-ITS traffic from the cellular network to the ad-hoc network when ad-hoc network connectivity to the interworking device 500 is available. An exemplary scenario involving such offloading is illustrated in FIG. 8.

Figure 8:
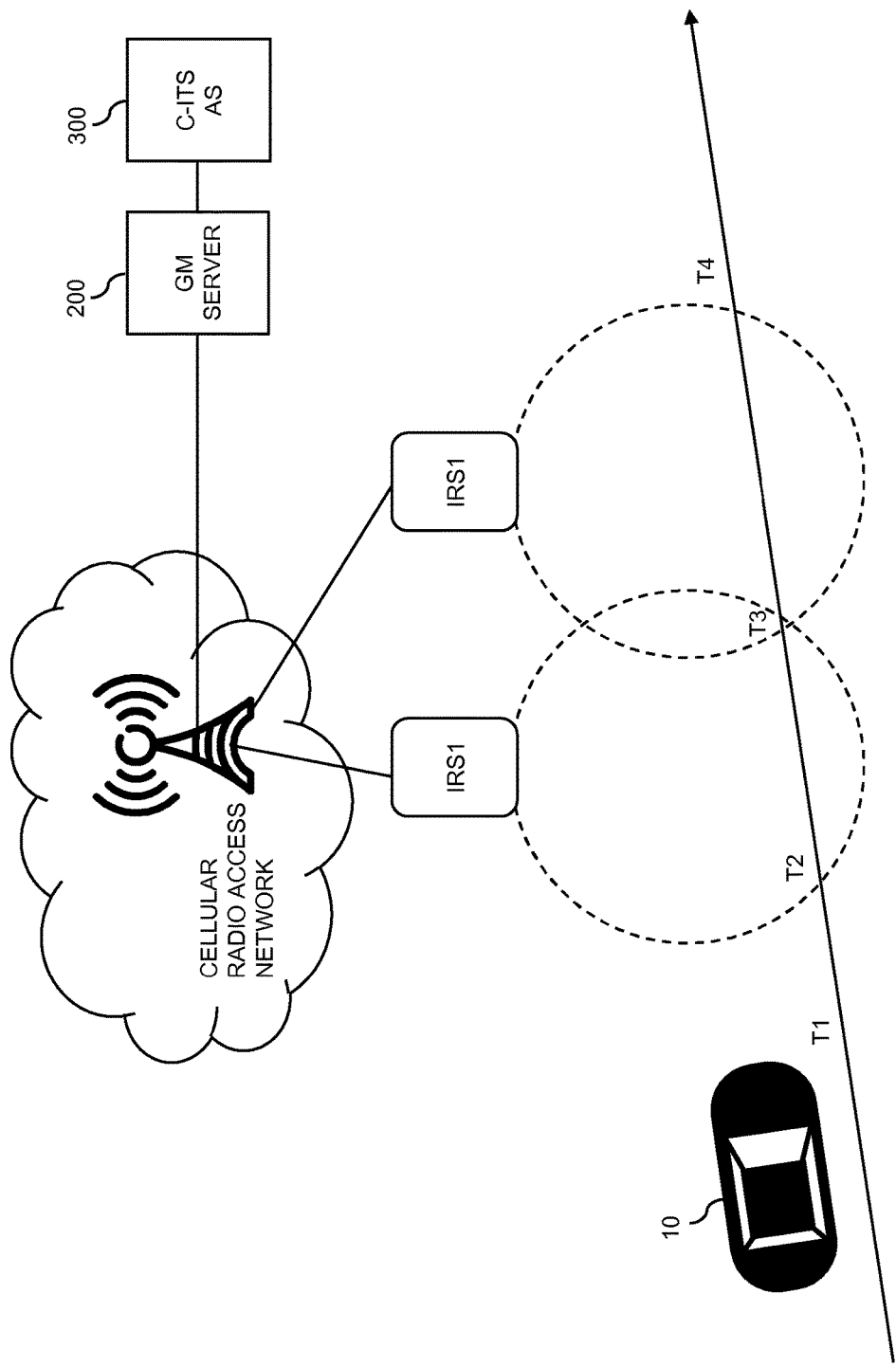
FIG. 8 schematically illustrates a further use case involving access selection by the vehicle based client which moves through ad-hoc network coverage of a first roadside station and a second roadside station.

The exemplary scenario of FIG. 8 assumes that the vehicle 10 (equipped with vehicle station 110) travels through ad-hoc network coverage of a first roadside station 20-1 and then through ad-hoc network coverage of a second roadside station 20-2, which are each equipped with the above interworking device, so that connectivity to the GM server 200 can also be provided via the ad-hoc network. At time T1 in the scenario of FIG. 8, the vehicle 10 is still outside the ad-hoc network coverage region of the first roadside station 20-1. At time T2 in the scenario of FIG. 8, the vehicle 10 has moved into the ad-hoc network coverage region of the first roadside station 20-1. At time T3 in the scenario of FIG. 8, the vehicle 10 has moved into the ad-hoc network coverage region of the second roadside station 20-1. At time T4 in the scenario of FIG. 8, the vehicle 10 has left the ad-hoc network coverage region of the second roadside station 20-1.

Procedures which may take place at T1, T2, T3, and T4 are illustrated by FIGS. 9, 10, 11, and 12, respectively. The procedures of FIGS. 9, 10, 11, and 12 involve the C-ITS server 300, the GM server 200, the first roadside station 20-1 (equipped with GM client 1 and IWF 1, corresponding to the GM client 210 and IWF 215 as illustrated in FIG. 4), the second roadside station 20-2 (equipped with GM client 2 and IWF 2, corresponding to the GM client 210 and IWF 215 as illustrated in FIG. 4), and the vehicle station 110 (equipped with GM client 3 and a C-ITS application client, corresponding to the GM client 112 and the C-ITS client 350 of FIG. 4).

Figure 9:
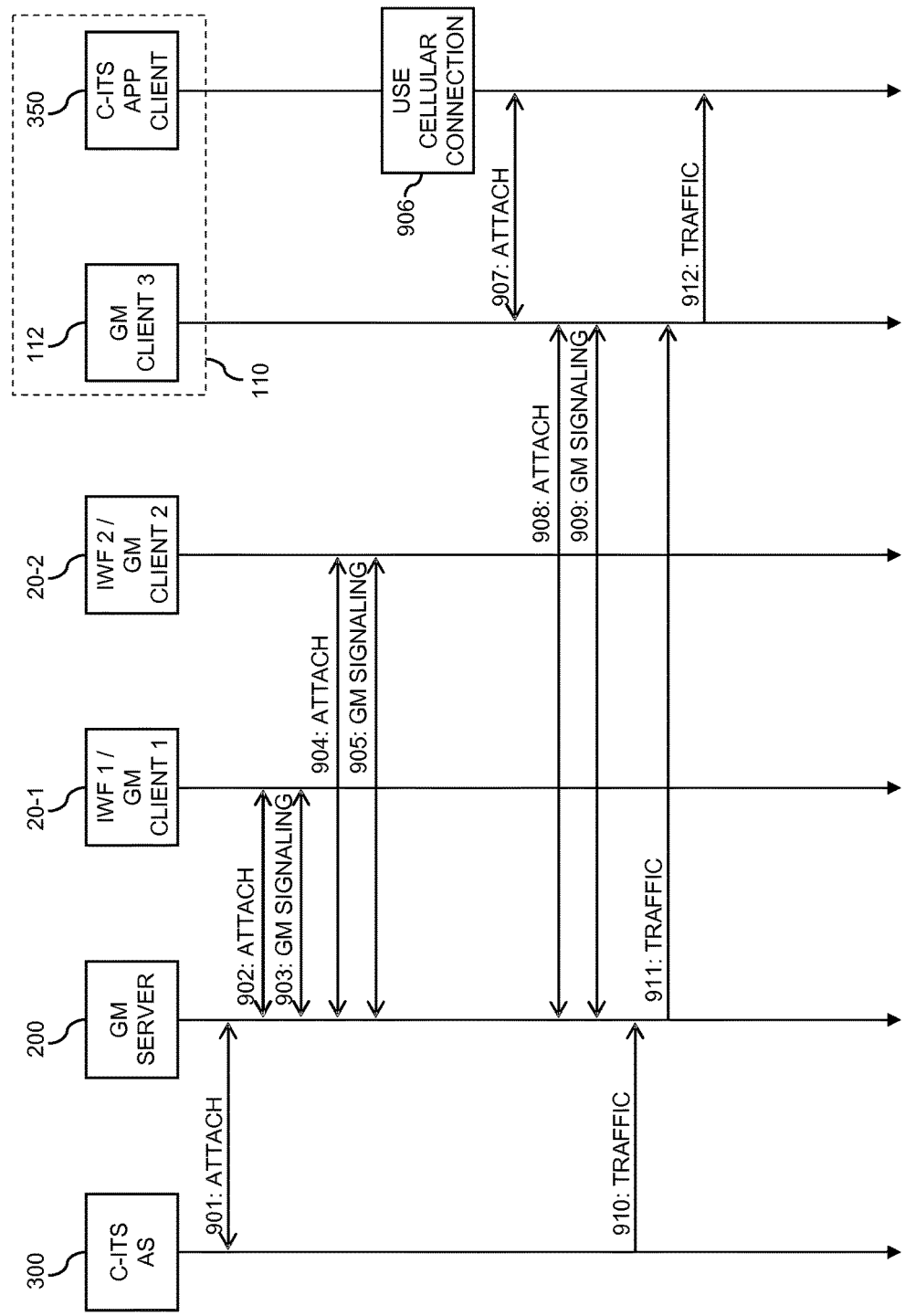
FIG. 9 shows a signaling diagram for illustrating processes at T1 of FIG. 8, before the vehicle based client enters coverage of the first roadside station.

The procedures of FIG. 9 are assumed to take place before the vehicle 10 enters the ad-hoc network coverage region of the first roadside station 20-1.

At step 901, an attach procedure is performed between the C-ITS server 300 and the GM server 200. At this point, the C-ITS AS 300 establishes a session with the GM server 200 so as to be able to utilize the GM server 200 for distribution of messages to clients.

At step 902, an attach procedure is performed between the GM server 200 and the first roadside station 20-1, and GM control plane signaling 903 is exchanged between the GM server 200 and the first roadside station 20-1 so as to establish a connection between the GM server 200 and the first roadside station 20-1. This may also involve providing information on a grid field to which the first roadside station 20-1 is assigned to the first roadside station 20-1. Further, this may involve registration for one or more C-ITS applications by the first roadside station 20-1.

At step 904, an attach procedure is performed between the GM server 200 and the second roadside station 20-2, and GM control plane signaling 905 is exchanged between the GM server 200 and the second roadside station 20-2 so as to establish a connection between the GM server 200 and the second roadside station 20-2. This may also involve providing information on a grid field to which the second roadside station 20-2 is assigned to the second roadside station 20-2. Further, this may involve registration for one or more C-ITS applications by the second roadside station 20-2.

At step 906, the vehicle station 110 decides to use a cellular network connection for connecting the C-ITS application client 350 via the GM client 112 to the GM server 200, e.g., in response to no ad-hoc network connection being available. Accordingly, an attach procedure 907 is performed between the C-ITS application client 350 and the GM client 112 of the vehicle station 110.

In response to the attach procedure 907, a further attach procedure 908 is performed between the GM client 112 of the vehicle station 110, thereby connecting the C-ITS application client 350 of the vehicle station via the GM client 112 and a cellular network connection to the GM server 200. At this point, also GM control plane signalling 909 is exchanged between the GM server 200 and the second GM client 112 of the vehicle station 110, which may involve providing information on a grid field to which the vehicle station 110 is assigned to the vehicle station 110. Further, this may involve registration for one or more C-ITS applications by the vehicle station 110.

After such preparatory steps, the C-ITS AS 300 may send traffic 910, which is then distributed by the GM server 200 via the cellular network connection to the GM client 112 of the vehicle station 110 and then further from the GM client 112 to the C-ITS application client 350 of the vehicle station 110, as indicated by messages 911 and 912.

Figure 10:
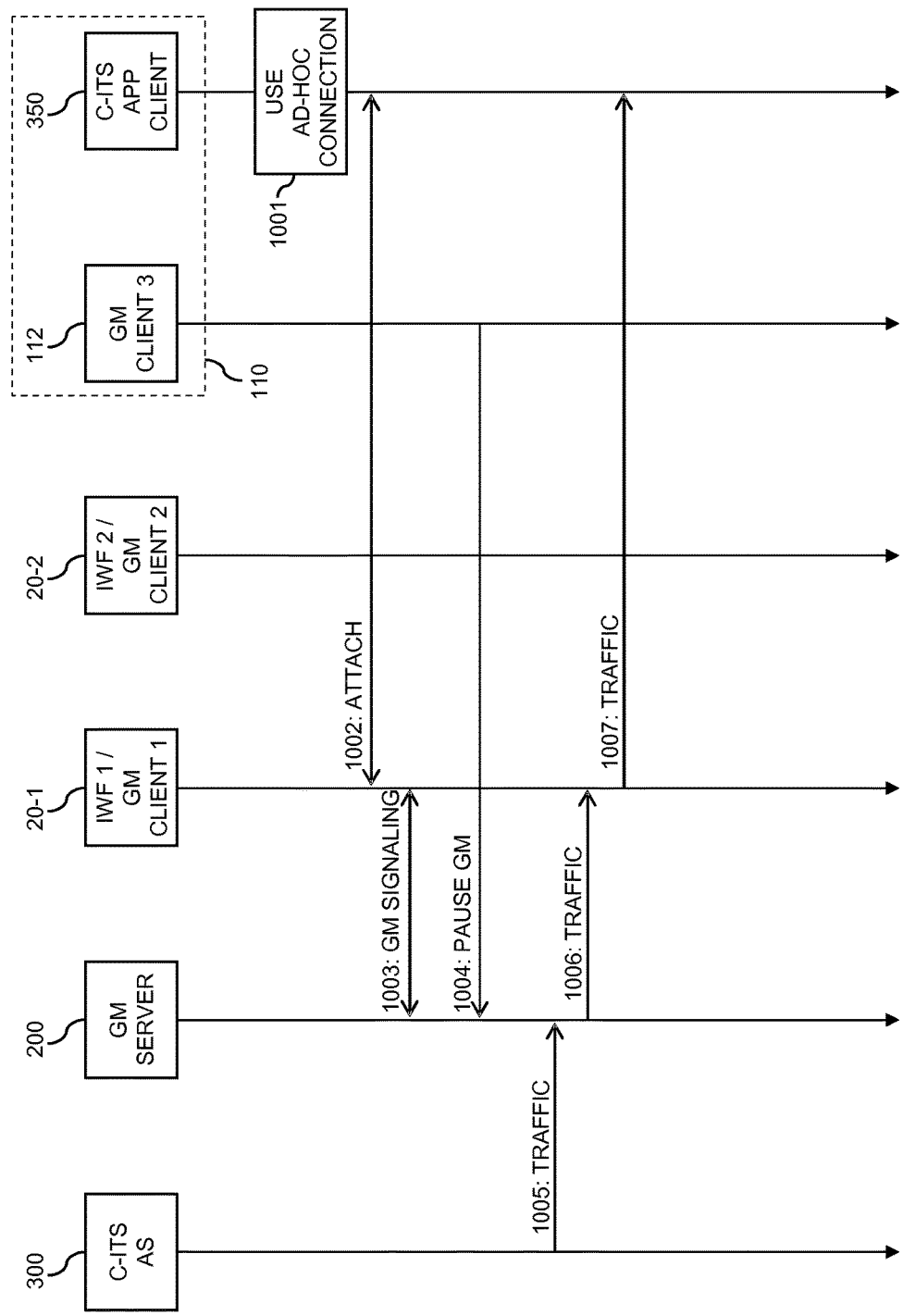
FIG. 10 shows a signaling diagram for illustrating processes at T2 of FIG. 8, when the vehicle based client enters coverage of the first roadside station.

When the vehicle 10 enters the ad-hoc network coverage region of the first roadside station 20-1 at T2, the procedures of FIG. 10 may be performed.

At step 1001, the vehicle station 110 decides to use an ad-hoc network connection for connecting the C-ITS application client 350 to the GM server 200, e.g., in response to detecting that the first roadside station 20-1 offers ad-hoc network connectivity. Accordingly, an attach procedure 1002 is performed between the C-ITS application client 350 and the IWF 215 of the first roadside station 20-1, thereby establishing an ad-hoc network connection between the first roadside station 20-1 and the C-ITS application client 350.

In response to the attach procedure 1002, GM control plane signalling 1003 is exchanged between the GM server 200 and the GM client 210 of the first roadside station 20-1, to register the GM client 210 of the first roadside station 20-1 on behalf of the C-ITS client 350 of the vehicle station 110 at the GM server 200. This may for example involve updating the applications services the GM client 210 of the first roadside station 20-1 is registered for or updating information on the grid field to which the first roadside station 20-1 is assigned, taking into account information on the vehicle station 110 as available at the first roadside station 20-1.

At this point, the C-ITS client 350 may use both the cellular connection via the GM client 112 and the ad-hoc connection to the GM client 210 in the roadside station 20-1 for sending or receiving C-ITS traffic, which already allows for reducing the load on the cellular network connection. In the illustrated scenario it is however assumed that complete offloading of the C-ITS traffic to the ad-hoc network connection is desirable. For this purpose, the GM client 112 of the vehicle station 110 sends a control message 1004 to the GM server 200. The control message 1004 causes the GM server 200 to pause distribution of messages via the cellular network connection and the GM client 112 to the vehicle station 110. The control message 1004 indicates to the GM server 200 that GM client 112 of the vehicle station 110 is temporarily excluded from message distribution. The control message 1004 does not need to be acknowledged by the GM sever 200 because the GM client 112 of the vehicle station may detect a failed transmission of the control message 1004 when it receives further messages from the GM server 200 and resend the control message 1004.

The C-ITS traffic is then distributed via the GM server 200 to the GM client 210 of the first roadside station 20-1, and then further via the IWF 215 of the first roadside station 20-1 and the ad-hoc network connection to the C-ITS application client 350 of the vehicle station 110, as indicated by messages 1005, 1006, and 1007.

Figure 11:
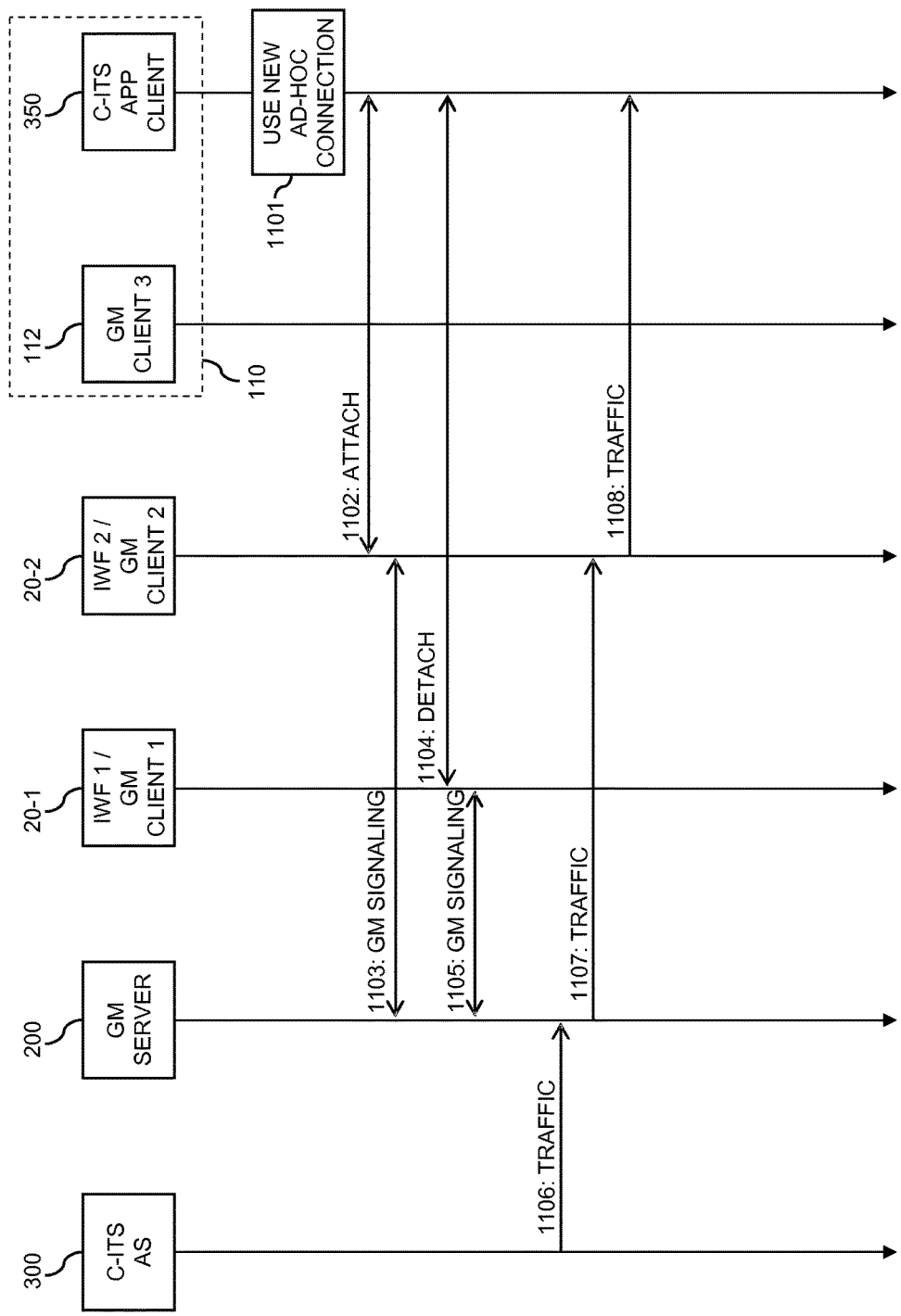
FIG. 11 shows a signaling diagram for illustrating processes at T2 of FIG. 8, when the vehicle based client enters coverage of the second roadside station.

When the vehicle 10 enters the ad-hoc network coverage region of the second roadside station 20-2 at T3, the procedures of FIG. 11 may be performed.

At step 1101, the vehicle station 110 decides to use a new ad-hoc network connection for connecting the C-ITS application client 350 to the GM server 200, e.g., in response to detecting that the second roadside station 20-2 offers ad-hoc network connectivity. Accordingly, an attach procedure 1102 is performed between the C-ITS application client 350 and the IWF 215 of the first roadside station 20-2, thereby establishing an ad-hoc network connection between the second roadside station 20-2 and the C-ITS application client 350.

In response to the attach procedure 1102, GM control plane signalling 1103 is exchanged between the GM server 200 and the GM client 210 of the second roadside station 20-2, to register the GM client 210 of the second roadside station 20-2 on behalf of the C-ITS client 350 of the vehicle station 110 at the GM server 200. This may for example involve updating the applications services the GM client 210 of the second roadside station 20-2 is registered for or updating information on the grid field to which the roadside station 20-2 is assigned, taking into account information on the vehicle station 110 as available at the second roadside station 20-2.

At this point, the C-ITS client 350 may use both the ad-hoc network connection to the first roadside station 20-1 and the ad-hoc connection to the second roadside station 20-2 for sending or receiving C-ITS traffic. In the illustrated scenario it is assumed that usage of multiple ad-hoc network connections in parallel is however not desired. Accordingly, the C-ITS client 350 detaches from the IWF 215 and GM client 210 of the first roadside station 20-1, as indicated by step 1104, so that only the ad-hoc network connection to the second roadside station 20-2 is maintained. In response to the detach procedure 1104, GM control plane signalling 1105 is exchanged between the GM server 200 and the GM client 210 of the first roadside station 20-1, to update registration of the GM client 210 of the first roadside station 20-1. This may for example involve deregistering from certain application services which are used by the C-ITS application client 350 of the vehicle station 110.

The C-ITS traffic is then distributed via the GM server 200 to the GM client 210 of the second roadside station 20-2, and then further via the IWF 215 of the second roadside station 20-2 and the ad-hoc network connection to the C-ITS application client 350 of the vehicle station 110, as indicated by messages 1106, 1107, and 1108.

Figure 12:
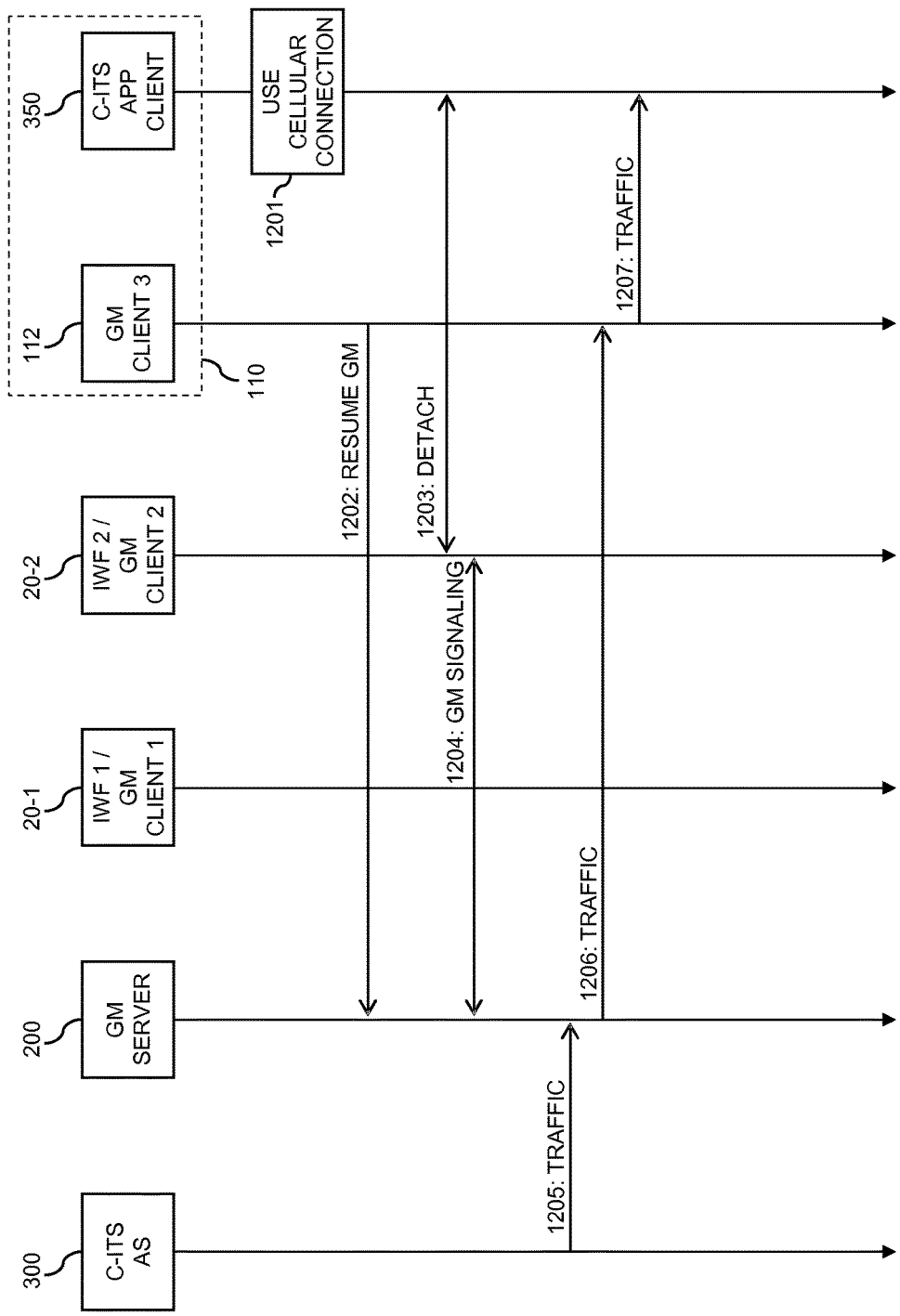
FIG. 12 shows a signaling diagram for illustrating processes at T2 of FIG. 8, when the vehicle based client leaves coverage of the second roadside station.

When the vehicle 10 leaves the ad-hoc network coverage region of the second roadside station 20-2 at T4, preferably before the ad-hoc network connection of the vehicle station 110 to the second roadside station is lost, the procedures of FIG. 12 may be performed.

At step 1201, the vehicle station 110 decides to return to using the cellular network connection for connecting the C-ITS application client 350 to the GM server 200, e.g., in response to detecting a fading quality of the ad-hoc network connection to the second roadside station 20-2. The GM client 112 of the vehicle station 110 therefore sends a control message 1202 to the GM server 200. The control message 1202 causes the GM server 200 to resume distribution of messages via the cellular network connection and the GM client 112 to the vehicle station 110. The control message 1202 indicates to the GM server 200 that GM client 112 of the vehicle station 110 is no longer excluded from message distribution. The control message 1202 is preferably acknowledged by the GM sever 200 because the GM client 112 otherwise cannot distinguish between a scenario in which there are no relevant messages for the GM client 112 and a scenario in which such relevant messages are not distributed to the GM client 112 due to unsuccessful transmission of the control message 1202. If within a certain time limit no acknowledgement for the control message 1202 is received by the GM client 112, the GM client may repeat sending of the control message 1202.

After message distribution to the GM client 112 has resumed, the C-ITS client 350 of the vehicle station 110 may then detach from the IWF 215 and GM client 210 of the second roadside station 20-2, as indicated by step 1203, so that only the cellular network connection via the GM client 112 to GM server 200 is maintained. In response to the detach procedure 1203, GM control plane signalling 1204 is exchanged between the GM server 200 and the GM client 210 of the second roadside station 20-2, to update registration of the GM client 210 of the second roadside station 20-1. This may for example involve deregistering from one or more application services which are used by the C-ITS application client 350 of the vehicle station 110.

The C-ITS traffic is then again distributed via the GM server 200 and the cellular network connection to the GM client 112 of the vehicle station 110, and then to the C-ITS application client 350 of the vehicle station 110, as indicated by messages 1205, 1206, and 1207.

In the procedures illustrated by FIGS. 8 to 12, the vehicle station 110 may use an access selector 114 as illustrated in FIG. 4 for selecting between using the GM client 112 and the cellular network connection or the ad-hoc network connection for connecting to the GM server 200. The access selector 114 may then accomplish routing of messages to corresponding interfaces of the vehicle station 110. Further, the access selector 114 may trigger the GM client 112 to send the control messages for pausing and resuming the distribution of messages to the GM client 112. However, corresponding functionalities of the access selector 114 could also be implemented within the GM client 112 and/or C-ITS application client 350.

Figure 13:
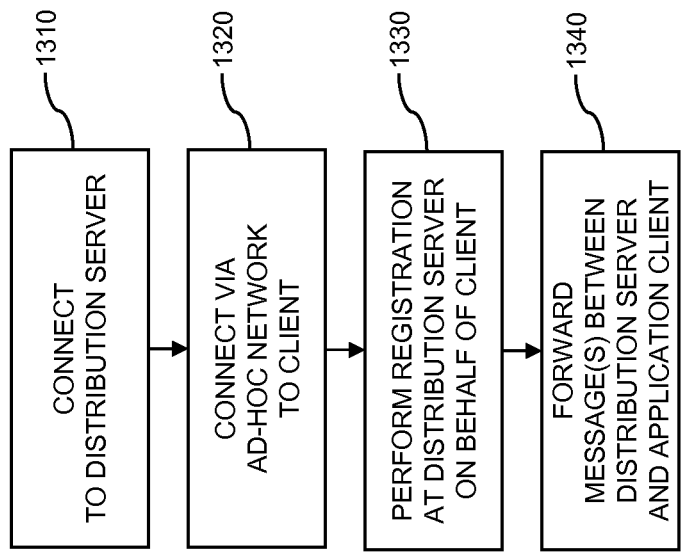
FIG. 13 shows a flowchart for illustrating a method according to an embodiment of the invention, which may be used for implementing functionalities of an interworking device.

FIG. 13 shows a flowchart for illustrating a method for providing an application service through a distribution server for geographically targeted message distribution to a client. The method of FIG. 13 may be used for implementing the above concepts in an interworking device, such as the interworking device illustrated in FIG. 5. As explained in connection with the use cases of FIGS. 2 and 3, the interworking device may be located onboard a vehicle or in a roadside station. If a processor based implementation of the interworking device is used, the steps of the method may be performed by one or more processors of the interworking device, and the processor(s) may send or receive messages or other information via corresponding interfaces of the interworking device, such as the interfaces 510 and 520 of FIG. 5. The client may for example be a vehicle station, such as the vehicle station 110, i.e., be located onboard a vehicle. In other scenarios, the client could also be a roadside station. The geographically targeted distribution of messages may for example be based on defining a grid and indicating information concerning fields of the grid to clients, so that the clients can update their location with the distribution server by indicating crossing of a grid field border, such as described in ETSI TS 103 084 and WO 2012/055433 A1. The application service may in particular be a C-ITS service or some other vehicular traffic related application service. The application service could also provide information on fuel prices or local points of interest to the client.

At step 1310, the interworking device connects to the distribution server. The connection of the interworking device to the distribution server may be via a cellular network connection, such as the cellular network connection 40. However, also other types of data connections may be used, e.g., an IP based wired connection if the interworking device is located in a roadside station.

At step 1320, the interworking device connects via an ad-hoc network connection to the client, such as via the ad-hoc network connection 50.

At step 1330, the interworking device performs registration for the application service at the distribution server. This is accomplished on behalf of the client connected via the ad-hoc network connection. The registration typically involves indicating to the distribution server which specific application service is used by the client, e.g., in terms of a service identifier, thereby avoiding unnecessary distribution of irrelevant messages to the interworking device. The registration may also involve updating the distribution server on the location of the client. For example, the interworking device may determine a geographical position of the client and indicate the determined geographical position to the distribution server. When using the above-mentioned grid based distribution scheme, the interworking device could determine on the basis of the geographical position of the client whether the client has crossed the border of the grid field and then provide a corresponding indication to the distribution server.

At step 1340, the interworking device forwards messages of the application service between the distribution server and the client. This is accomplished on the basis of the registration performed at step 1330. This may for example involve receiving one or more messages of the application service from the distribution server and sending these messages via the ad-hoc network connection to the client. In addition or as an alternative, the forwarding may also involve receiving one or more messages of the application service via the ad-hoc network connection from the client and sending these one or more messages to the distribution server.

In some implementations, the interworking device may also determine a type of the message(s) received via the ad-hoc network connection and provide the message(s) sent to the distribution server with a service identifier corresponding to the determined type. For example, the interworking device may detect whether the message is a CAM or DENM and select the service identifier accordingly. The interworking device may also determine whether the message includes an emergency warning, general traffic information, or information concerning a specific vehicle and select the service identifier accordingly. The service identifier may then be included in a GM header as for example illustrated in FIG. 7.

In some implementations, the interworking device may also aggregate a plurality of the messages received via the ad-hoc network connection and then send the aggregated messages to the distribution server. Alternatively or in addition, the interworking device may filter one or more messages from the messages received via the ad-hoc network connection and send the filtered messages to the distribution server. In this way, the connection to the distribution server may be utilized in an efficient manner.

In some implementations, the forwarding may also involve that the interworking device receives one or more messages of the application service, determines a target area for distribution of these messages by the distribution server, sends these messages and an indication of the determined target area to the distribution server. This may be achieved by using a GM dissemination capability of the interworking device, as for example explained in connection with the GM sender 514 of FIG. 5. In such implementations, the interworking device may determine the target area on the basis of information in the received messages, e.g., accident warning and location of accident, or from indications of vehicle position or direction of vehicle movement in the messages. The interworking device may also determine the target area on the basis of a geographical position of the client. The geographical position can be indicated in the messages or otherwise be estimated by the interworking device, e.g., using a positioning source of the interworking device, such as the positioning source 540, and assuming that the client is close to the interworking device, i.e., within the limited range of the ad-hoc network connection.

In some implementations, the forwarding may also involve translation between a location based addressing scheme of the ad-hoc network connection and an Internet Protocol based addressing scheme of the connection between the interworking device and the distribution server, e.g., as explained in connection with FIGS. 6 and 7.

In some implementations, the interworking device may also receiving a message of the application service via the ad-hoc network connection and then select between a) forwarding the message via the distribution server to an application server providing the application service and b) forwarding the message to the application server without passing through the distribution server. An example for option a) is the forwarding via path A or B and the GM server 200 to the C-ITS 300, and an example of option b) is the forwarding via path C directly to the C-ITS AS 300, as illustrated in FIG. 5.

Figure 14:
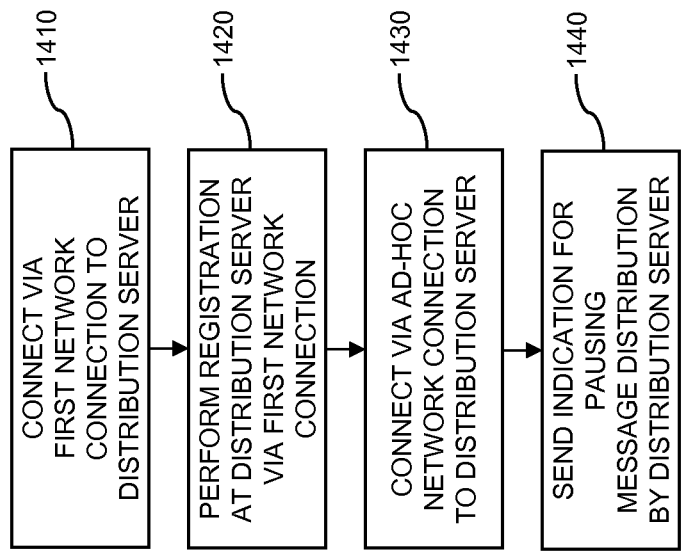
FIG. 14 shows a flowchart for illustrating a further method according to an embodiment of the invention, which may be used for implementing functionalities of a client.

FIG. 14 shows a flowchart for illustrating a further method for providing an application service through a distribution server for geographically targeted message distribution to a client. The method of FIG. 14 may be used for implementing the above concepts in a client, such as the vehicle station 110. In particular, the method of FIG. 14 may be used for implementing offloading as described in the use case of FIG. 4. The client may for example be a vehicle station, such as the vehicle station 110, i.e., be located onboard a vehicle. In other scenarios, the client could also be a roadside station. If a processor based implementation of the client is used, the steps of the method may be performed by one or more processors of the client, and the processor(s) may send or receive messages or other information via corresponding interfaces of the client. The geographically targeted distribution of messages may for example be based on defining a grid and indicating information concerning fields of the grid to clients, so that the clients can update their location with the distribution server by indicating crossing of a grid field border, such as described in ETSI TS 103 084 and WO 2012/055433 A1. The vehicular traffic related application service may in particular be a C-ITS service or some other vehicular traffic related application service. The application service could also provide information on fuel prices or local points of interest to the client.

At step 1410, the client connects via a first network connection to the distribution server. The first network connection may be an IP based connection. The first network connection may be wireless, in particular a cellular network connection, such as the cellular network connection 40'. However, in some implementations, the first network connection could also be a wired connection.

At step 1420, the client performs registration for the application service at the distribution server. This is accomplished via the first network connection. This allows the client to receive one or more messages of the application service via the first network connection from the distribution server. The registration typically involves indicating to the distribution server which specific application service is used by the client, e.g., in terms of a service identifier. The registration may also involve updating the distribution server on the location of the client. For example, the client may determine its geographical position and indicate the determined geographical position to the distribution server. When using the above-mentioned grid based distribution scheme, the client could determine on the basis of its geographical position whether it has crossed the border of the grid field and then provide a corresponding indication to the distribution server. The distribution server may in turn adapt the grid and indicate the grid field to the client.

At step 1430, the client connects via an ad-hoc network connection to an interworking device, such as illustrated in FIG. 5. The interworking device is configured to register for the application service at the distribution server on behalf of the client. This allows the client to receive one or more messages of the application service via the interworking device and the ad-hoc network connection from the distribution server. As explained above, the interworking device may be located onboard a vehicle or in a roadside station. The interworking device is connected via a second network connection to the distribution server and is configured to perform registration at the distribution server via the second network connection. The second network connection may be wireless, in particular a cellular network connection, such as the cellular network connection 40. However, in some implementations, the second network connection could also be a wired connection.

At step 1440, the client sends an indication to the distribution server for controlling the distribution server to pause distribution of messages via the first network connection to the client. This indication is sent via the first network connection. The indication may for example be sent in a control message, such as the control message 1104 of FIG. 11.

Subsequently, the client may send a further indication via the first network connection to the distribution server for controlling the distribution server to resume distribution of messages via the first network connection to the client. The further indication may for example be sent in a control message, such as the control message 1202 of FIG. 12.

Figure 15:
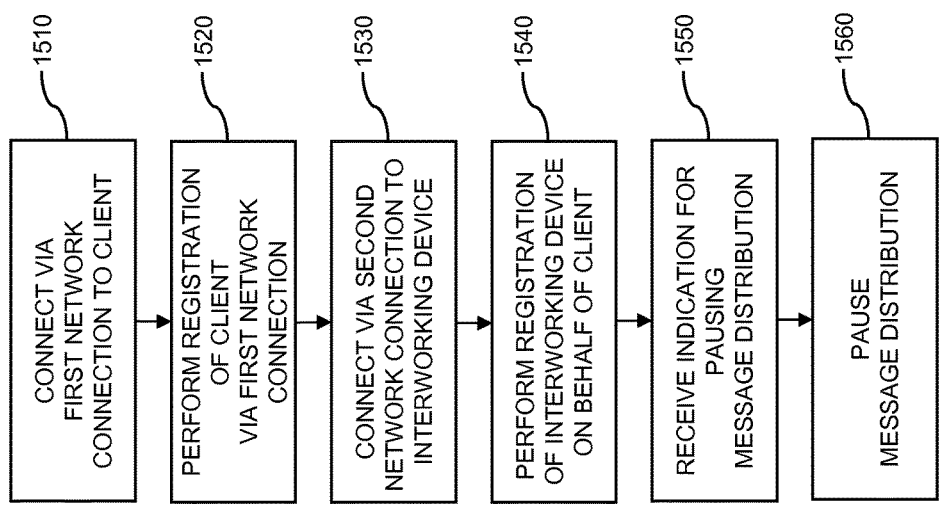
FIG. 15 shows a flowchart for illustrating a further method according to an embodiment of the invention, which may be used for implementing functionalities of a distribution server.

FIG. 15 shows a flowchart for illustrating a further method for providing an application service through a distribution server for geographically targeted message distribution to a client. The method of FIG. 15 may be used for implementing the above concepts in a distribution server, such as the distribution server 200. In particular, the method of FIG. 15 may be used for implementing offloading as described in the use case of FIG. 4. The client may for example be a vehicle station, such as the vehicle station 110, i.e., be located onboard a vehicle. In other scenarios, the client could also be a roadside station. If a processor based implementation of the distribution server is used, the steps of the method may be performed by one or more processors of the distribution server, and the processor(s) may send or receive messages or other information via corresponding interfaces of the distribution server. The geographically targeted distribution of messages may for example be based on defining a grid and indicating information concerning fields of the grid to clients, so that the clients can update their location with the distribution server by indicating crossing of a grid field border, such as described in ETSI TS 103 084 and WO 2012/055433 A1. The vehicular traffic related application service may in particular be a C-ITS service or some other vehicular traffic related application service.

At step 1510, the distribution server connects via a first network connection to the client. The first network connection may be an IP based connection. The first network connection may be wireless, in particular a cellular network connection, such as the cellular network connection 40'. However, in some implementation, the first network connection could also be a wired connection.

At step 1520, the distribution server performs registration of the client for the application service. This is accomplished via the first network connection. This allows the distribution server to send at least one message of the application service via the first network connection to the client. The registration typically involves receiving an indication which specific application service is used by the client, e.g., in terms of a service identifier. The registration may also involve being updated on the location of the client. For example, the client may determine its geographical position and indicate the determined geographical position to the distribution server. When using the above-mentioned grid based distribution scheme, the client could determine on the basis of its geographical position whether it has crossed the border of the grid field and then provide a corresponding indication to the distribution server. The distribution server may in turn adapt the grid and indicate the grid field to the client.

At step 1530, the distribution server connects via a second network connection to an interworking device which is connected via an ad-hoc network connection to the client, such as the interworking device illustrated in FIG. 5. The ad-hoc connection to the client may be established after the distribution server connects to the interworking device or may already be present when the distribution server connects to the interworking device. The second network connection may be wireless, in particular a cellular network connection, such as the cellular network connection 40. However, in some implementations, the second network connection could also be a wired connection. As explained above, the interworking device may be located onboard a vehicle or in a roadside station.

At step 1540, the distribution server performs registration of the interworking device on behalf of the client. This registration is accomplished via the second network connection. The registration typically involves indicating to the distribution server which specific application service is used by the client, thereby avoiding unnecessary distribution of irrelevant messages to the interworking device. The registration may also involve updating the distribution server on the location of the client. For example, the interworking device may determine a geographical position of the client and indicate the determined geographical position to the distribution server. When using the above-mentioned grid based distribution scheme, the interworking device could determine on the basis of the geographical position of the client whether the client has crossed the border of the grid field and then provide a corresponding indication to the distribution server.

The connection and registration of steps 1530 and 1540 allow the distribution server to send one or more messages of the application service via the interworking device and the ad-hoc network connection to the client.

At step 1550, the distribution server receives an indication from the client for controlling the distribution server to pause distribution of messages via the first network connection to the client. This indication is received via the first network connection. The indication may for example be sent in a control message, such as the control message 1104 of FIG. 11.

At step 1560, in response to receiving the indication of step 1550, the distribution server pauses distribution of messages via the first network connection to the client.

Subsequently, the distribution server may receive a further indication via the first network connection to the distribution server for controlling the distribution server to resume distribution of messages via the first network connection to the client, such as with the control message 1202 of FIG. 12. In response to such further indication, the distribution server may resume distribution of messages via the first network connection to the client.

It is to be understood that at least two of the methods of FIGS. 13, 14, and 15 may also be combined with each other, e.g., in a system including at least two of the interworking device operating according to the method of FIG. 13, the client operating according to the method of FIG. 14, and the distribution server operating according to the method of FIG. 15.

Figure 16:
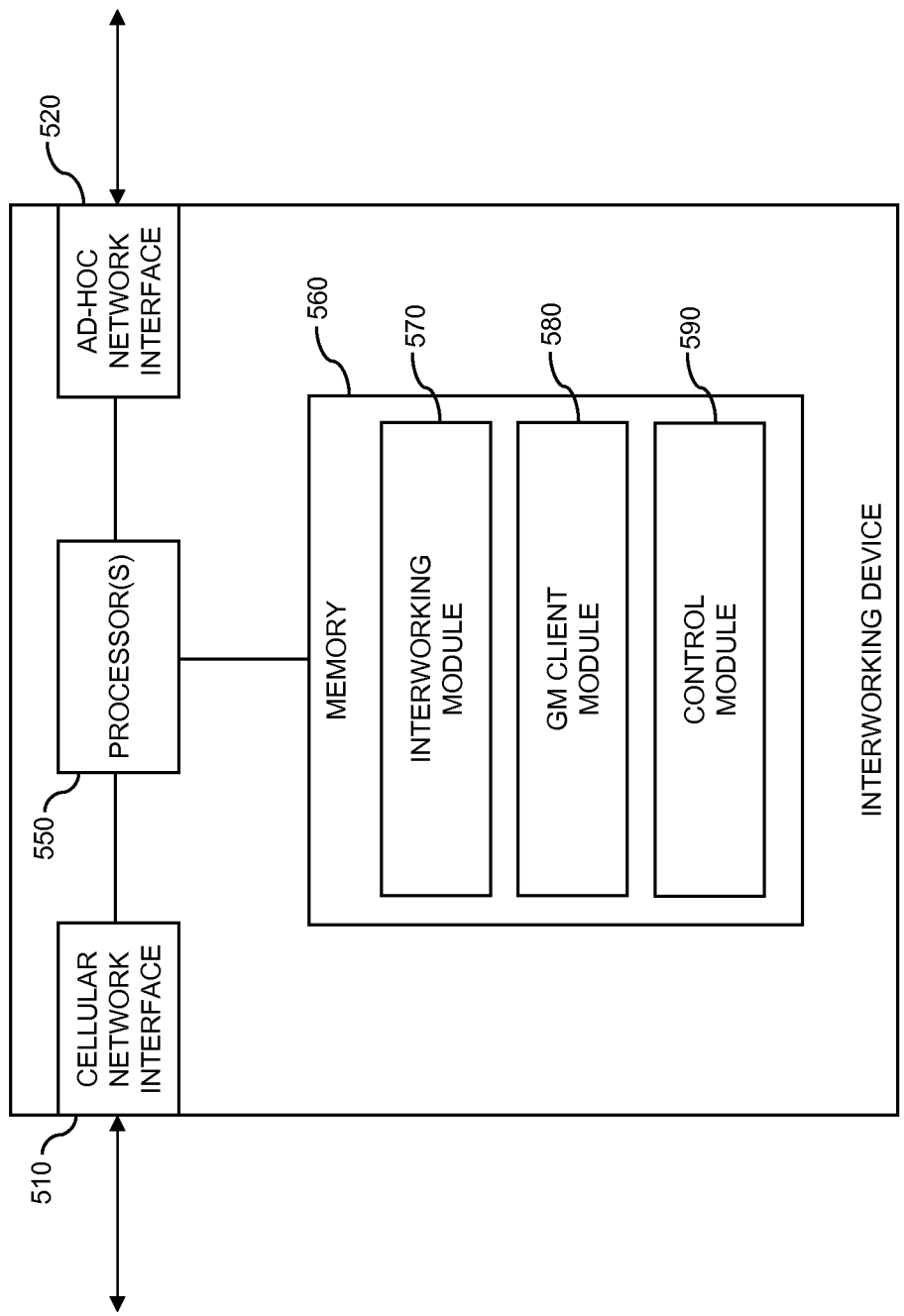
FIG. 16 schematically illustrates structures of an interworking device according to an embodiment of the invention.

FIG. 16 schematically illustrates a processor based implementation of the interworking device. The interworking device of FIG. 16 may for example correspond to the above interworking device 500.

In the illustrated example, the interworking device includes a cellular network interface 510 and an ad-hoc network interface 520. The cellular network interface 510 allows for connecting the interworking device to the distribution server, e.g., to the GM server 200. The cellular network interface may for example use the GSM, UMTS, LTE or CDMA2000 radio technology and correspond to the Gcn interface specified in ETSI TS 103 084. The ad-hoc network interface 520 may be used for connecting the interworking device to a client. The ad-hoc network interface may for example use the IEEE 802.11p or LTE D2D radio technology. As mentioned above, in some implementations the cellular network interface 510 may also be replaced by another type of interface which allows for connecting to the distribution server, e.g., another kind of wireless interface providing IP connectivity or an IP based wired interface.

Further, the interworking device includes one or more processor(s) 550 coupled to the interfaces 510, 520 and a memory 560 coupled to the processor 550. The memory 560 may include a read-only memory (ROM), e.g., a flash ROM, a random-access memory (RAM), e.g., a dynamic RAM (DRAM) or static RAM (SRAM), a mass storage, e.g., a hard disk or solid state disk, or the like. The memory 560 includes suitably configured program code modules to be executed by the processor(s) 550 so as to implement the above-described functionalities of the interworking device. More specifically, the program code modules in the memory 560 may include an interworking module 570 so as to implement the above-described functionalities of the IWF 215, such as forwarding of messages, maintaining information on clients connected via the ad-hoc network interface 520, or conversion of messages. Further, the program code modules in the memory 560 may also include a GM client module 580 so as to implement the above-mentioned functionalities of the GM client 210 in the interworking device, such as performing registration on behalf of clients connected via the ad-hoc network interface. Still further, the program code modules in the memory 560 may also include a control module 590 so as to implement general control functionalities, such as controlling the interfaces or configuring functionalities of the interworking module 570 and/or of the GM client module 580, e.g., using a management client 540 and management server 400 as illustrated in FIG. 5.

It is to be understood that the structure as illustrated in FIG. 16 is merely schematic and that the interworking device may actually include further components which, for the sake of clarity, have not been illustrated, e.g., further interfaces. Also, it is to be understood that the memory 560 may include further types of program code modules, which have not been illustrated, e.g., program code modules for implementing known functionalities of communication devices in the vehicular field. In some implementations, also a computer program may be provided for implementing functionalities of the interworking device, e.g., in the form of tangible product such as a non-transitory medium storing one or more of the program code modules to be stored in the memory 560 or by making one or more of the program code modules available for download.

Figure 17:
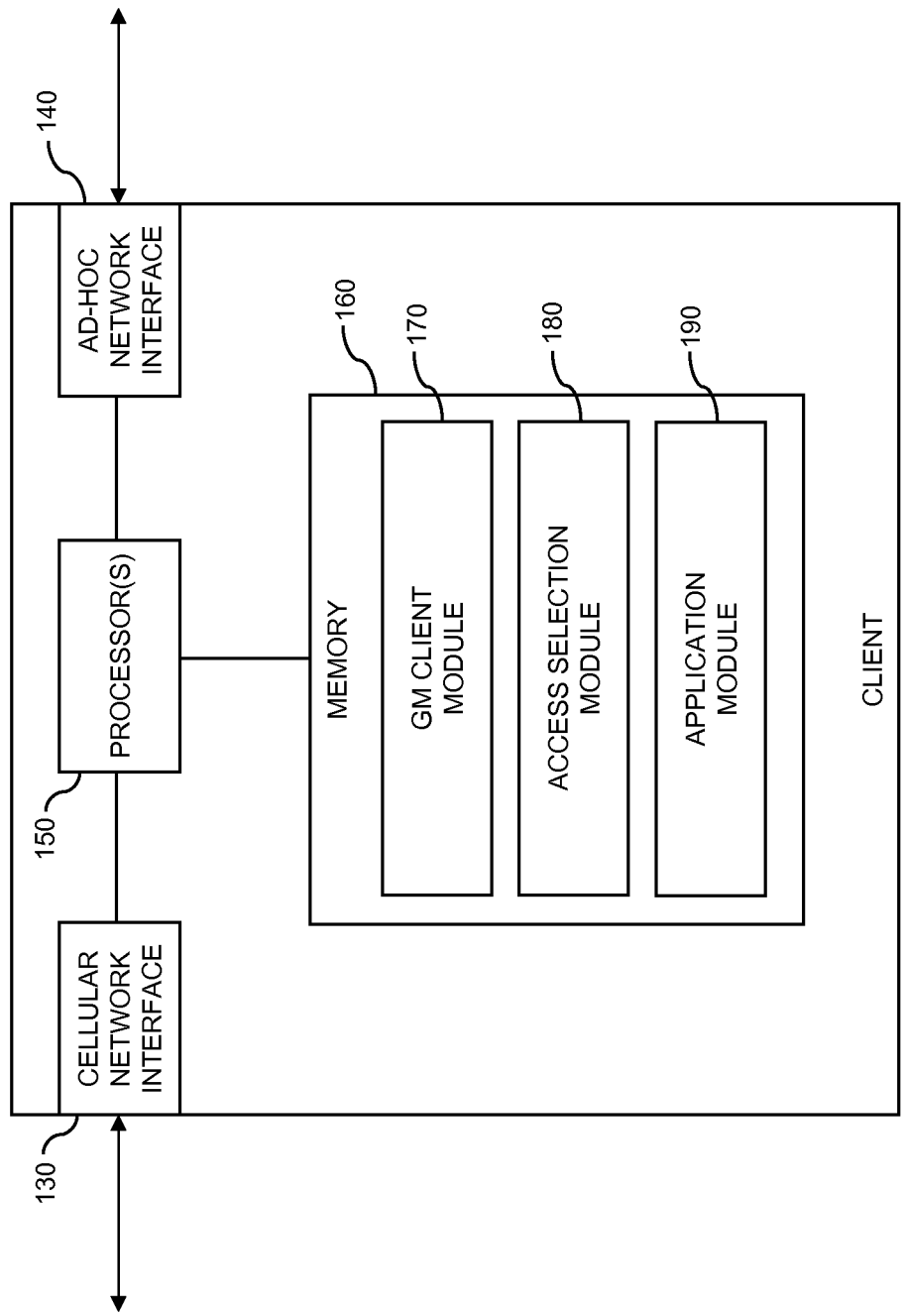
FIG. 17 schematically illustrates structures of a client according to an embodiment of the invention.

FIG. 17 schematically illustrates a processor based implementation of the client. The client of FIG. 17 may for example correspond to the above vehicle station 110. In other implementations, the client of FIG. 17 may correspond to a roadside station.

In the illustrated example, the client includes a cellular network interface 130 and an ad-hoc network interface 140. The cellular network interface 130 allows for connecting the client via a first network connection to the distribution server, e.g., to the GM server 200. The cellular network interface 130 may for example use the GSM, UMTS, LTE or CDMA2000 radio technology and correspond to the Gcn interface specified in ETSI TS 103 084. The ad-hoc network interface 140 may be used for connecting the client to the interworking device, e.g., to the interworking device 500, which is connected via a second network connection to the distribution server. The ad-hoc network interface may for example use the IEEE 802.11p or LTE D2D radio technology. As mentioned above, in some implementations the cellular network interface 130 may also be replaced by another type of interface which allows for connecting to the distribution server, e.g., another kind of wireless interface providing IP connectivity or an IP based wired interface.

Further, the client includes one or more processor(s) 150 coupled to the interfaces 130, 140 and a memory 160 coupled to the processor 150. The memory 160 may include a ROM, e.g., a flash ROM, a RAM, e.g., a DRAM or SRAM, a mass storage, e.g., a hard disk or solid state disk, or the like. The memory 160 includes suitably configured program code modules to be executed by the processor(s) 150 so as to implement the above-described functionalities of the client. More specifically, the program code modules in the memory 160 may include a GM client 170 so as to implement the above-described functionalities of the GM client 112 in the client, such as registration at the distribution server and forwarding messages to or from the C-ITS application client 350. Further, the GM client module 170 may implement the functionalities for sending the distribution server indications to pause or resume message distribution via the first network connection to the client. Further, the memory 160 may include an access selection module 180 for implementing functionalities of selecting between the first network connection and the ad-hoc network connection to the distribution server. That is to say, the access selection module may be used for implementing functionalities of the access selector 114 in the use case of FIG. 4. Still further, the program code modules in the memory 160 may also include an application module 190 so as to implement one or more applications which utilize the messages distributed by the distribution server, e.g., a C-ITS application or some other vehicular traffic related application.

It is to be understood that the structure as illustrated in FIG. 17 is merely schematic and that the client may actually include further components which, for the sake of clarity, have not been illustrated, e.g., further interfaces. Also, it is to be understood that the memory 160 may include further types of program code modules, which have not been illustrated, e.g., program code modules for implementing known functionalities of communication devices in the vehicular field or program code modules for implementing generic control functionalities. In some implementations, also a computer program may be provided for implementing functionalities of the client, e.g., in the form of tangible product such as a non-transitory medium storing one or more of the program code modules to be stored in the memory 160 or by making one or more of the program code modules available for download.

Figure 18:
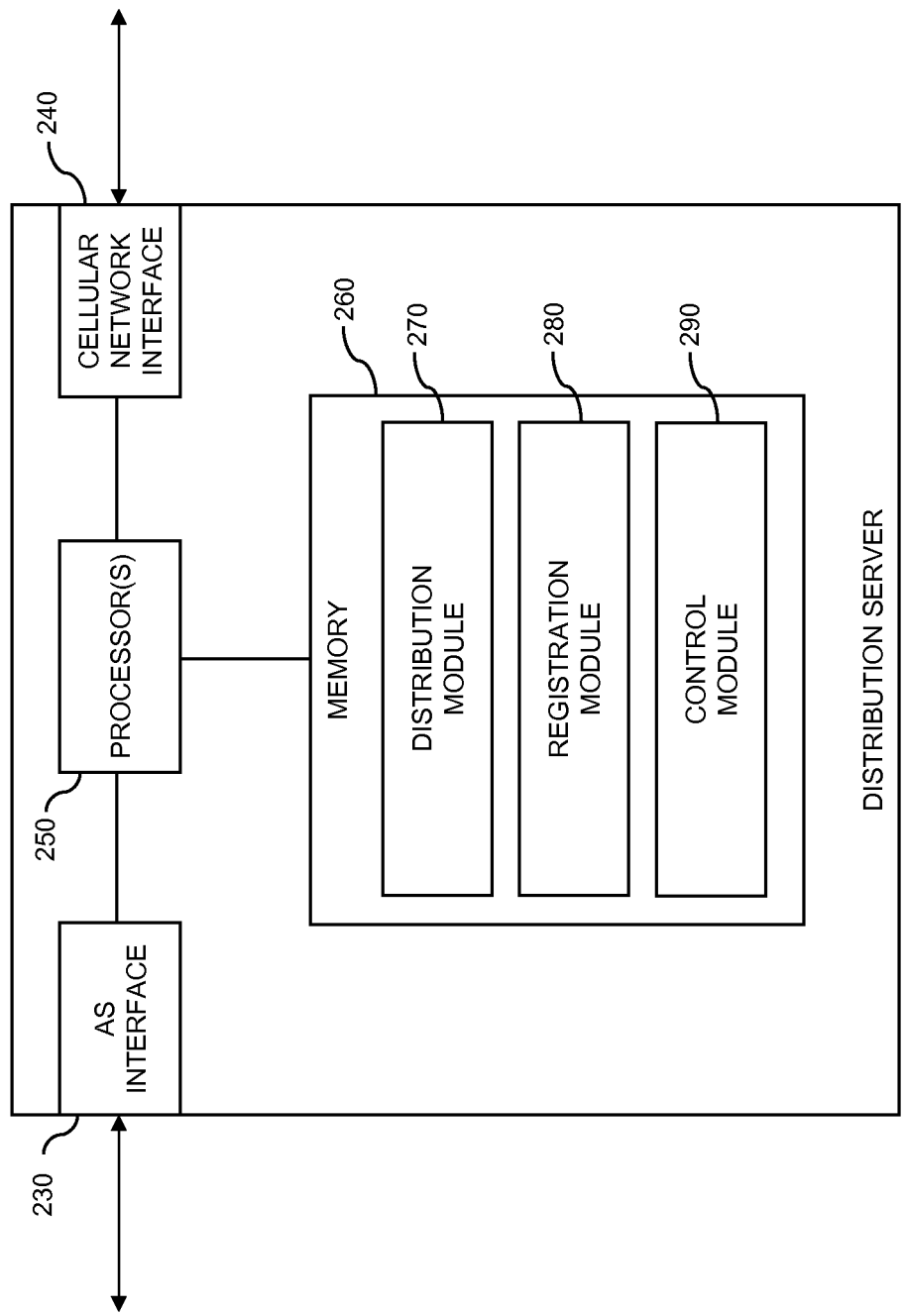
FIG. 18 schematically illustrates structures of a distribution server according to an embodiment of the invention.

FIG. 18 schematically illustrates a processor based implementation of the distribution server. The distribution server of FIG. 18 may for example correspond to the above GM server 200.

In the illustrated example, the distribution server client includes an AS interface 230 and a cellular network interface 240. The AS interface 230 allows for connecting the distribution server to an AS, such as the C-ITS AS 300. The AS interface may for example correspond to the Gse interface specified in ETSI TS 103 084. The cellular network interface 240 allows for connecting the distribution server via a cellular network to the client. For example, the cellular network interface may correspond to the Gen interface specified in ETSI TS 103 084. As mentioned above, in some implementations the cellular network interface 240 may also be replaced by another type of interface which allows for connecting to the client, e.g., an interface to another kind of wireless or wired IP network.

Further, the distribution server includes one or more processor(s) 250 coupled to the interfaces 230, 240 and a memory 260 coupled to the processor 250. The memory 260 may include a ROM, e.g., a flash ROM, a RAM, e.g., a DRAM or SRAM, a mass storage, e.g., a hard disk or solid state disk, or the like. The memory 260 includes suitably configured program code modules to be executed by the processor(s) 250 so as to implement the above-described functionalities of the distribution server. More specifically, the program code modules in the memory 260 may include a distribution module 270 so as to implement the above-described functionalities of geographically distributing messages, such as selecting clients to which messages are distributed depending on the location of the clients and suitably generating the messages. Further, the memory 260 may include a registration module 280 for implementing functionalities for performing registration of clients, such as maintaining information on the application service used by a particular client, maintaining information on the location of the client, or managing the grid of a grid based scheme for organizing the message distribution. Still further, the program code modules in the memory 260 may also include a control module 290 so as to implement control functionalities of the distribution server, in particular pausing and resuming the message distribution to the client when receiving corresponding indication from the client.

It is to be understood that the structure as illustrated in FIG. 18 is merely schematic and that the distribution server may actually include further components which, for the sake of clarity, have not been illustrated, e.g., further interfaces. Also, it is to be understood that the memory 260 may include further types of program code modules, which have not been illustrated, e.g., program code modules for implementing known functionalities of a GM enabler such as described in ETSI TS 103 084. In some implementations, also a computer program may be provided for implementing functionalities of the distribution server, e.g., in the form of tangible product such as a non-transitory medium storing one or more of the program code modules to be stored in the memory 260 or by making one or more of the program code modules available for download.

As can be seen, the concepts as described above may be used for efficiently performing geographically targeted distribution of application service messages via a centralized distribution server and an ad-hoc network. The concepts may in particular be used for allowing different distribution paths, e.g., using a cellular network connection to the client, an ad-hoc network connection to the client, or both. Such distribution paths may be selected depending on various criteria, e.g., depending on the location of the client.

It is to be understood that the examples and embodiments as explained above are merely illustrative and susceptible to various modifications. For example, the concepts could be used in connection with various types of radio technology or distribution mechanism.

Moreover, it is to be understood that the above concepts may be implemented by using correspondingly designed software to be executed by one or more processors of an existing device, or by using dedicated device hardware. Also, the devices as described herein may be implemented by a single device or by a system of multiple component devices. For example, the distribution server could be implemented by a functionally and/or geographically distributed server system.

The invention claimed is:

1. A method for providing an application service through a distribution server for geographically targeted message distribution to a client, the method comprising:
   an interworking device connecting to the distribution server;
   the interworking device connecting via an ad-hoc network connection to the client;
   on behalf of the client, the interworking device performing registration for the application service at the distribution server; and
   on the basis of the registration, the interworking device forwarding at least one message of the application service between the distribution server and the client.

2. The method according to claim 1,
   wherein said forwarding of the at least one message comprises receiving one or more messages of the application service from the distribution server and sending said one or more messages via the ad-hoc network connection to the client.

3. The method according to claim 1,
   wherein said forwarding of the at least one message comprises receiving one or more messages of the application service via the ad-hoc network connection from the client and sending said one or more messages to the distribution server.

4. The method according to claim 3, comprising:
   the interworking device determining a type of said one or more messages received via the ad-hoc network connection; and
   the interworking device providing said one or more messages sent to the distribution server with a service identifier corresponding to the determined type.

5. The method according to claim 3, comprising:
   the interworking device aggregating a plurality of said messages received via the ad-hoc network connection; and
   the interworking device sending the aggregated messages to the distribution server; or
   the interworking device filtering one or more messages from a plurality of said messages received via the ad-hoc network connection; and
   the interworking device sending the filtered messages to the distribution server.

6. The method according to claim 1,
   wherein said forwarding of the at least one message comprises:
   the interworking device receiving one or more messages of the application service;
   the interworking device determining a target area for distribution of said one or more messages by the distribution server; and
   the interworking device sending said one or more messages and an indication of the determined target area to the distribution server.

7. The method according to claim 6,
   wherein the interworking device determines the target area
   on the basis of information in said one or more messages, or
   on the basis of a geographical position of the client.

8. The method according to claim 1,
   wherein said forwarding of the at least one message comprises translation between a location based addressing scheme of the ad-hoc network connection and an Internet Protocol based addressing scheme of a connection between the interworking device and the distribution server.

9. The method according to claim 1, comprising:
   the interworking device determining a geographical position of the client; and
   the interworking device indicating the determined geographical position to the distribution server.

10. The method according to claim 1, comprising:
    the interworking device receiving a message of the application service via the ad-hoc network connection; and
    the interworking device selecting between:
    a) forwarding the message via the distribution server to an application server providing the application service, and
    b) forwarding the message to the application server without passing through the distribution server.

11. A method for providing an application service through a distribution server for geographically targeted message distribution to a client, the method comprising:
    via a first network connection, the client connecting to the distribution server and performing registration at the distribution server;
    via an ad-hoc network connection, the client connecting to an interworking device configured to register for the application service at the distribution server on behalf of the client via a second network connection; and
    via the first network connection, the client sending an indication to the distribution server for controlling the distribution server to pause distribution of messages of the application service via the first network connection to the client.

12. The method according to claim 11, comprising:
    the client sending via the first network connection a further indication to the distribution server for controlling the distribution server to resume distribution of messages of the application service via the first network connection to the client.

13. The method according to claim 11, comprising:
    the client receiving at least one message of the application service via the first network connection from the distribution server; or via the second network connection, the interworking device, and the ad-hoc network connection from the distribution server.

14. A method for providing an application service through a distribution server for geographically targeted message distribution to a client, the method comprising:

via a first network connection, the distribution server connecting to the client and performing registration of the client;

via a second network connection, the distribution server connecting to an interworking device providing an ad-hoc network connection to the client;

via the second network connection, the distribution server registering the interworking device on behalf of the client for the application service;

via the first network connection, the distribution server receiving an indication from the client; and in response to the indication, the distribution server pausing distribution of messages of the application service via the first network connection to the client.

15. The method according to claim 14, comprising:

via the first network connection, the distribution server receiving a further indication from the client; and in response to the further indication, the distribution server resuming distribution of messages of the application service via the first network connection to the client.

16. The method according to claim 14, comprising:

the distribution server sending at least one message of the application service via the first network connection to the client; or via the second network connection, the interworking device, and the ad-hoc network connection to the client.

17. A device for providing an application service through a distribution server for geographically targeted message distribution to a client, the device comprising:

a cellular interface for connecting to the distribution server;

an ad-hoc interface interface for connecting via an ad-hoc network connection to the client;

at least one processor; and a memory containing instructions executable by the at least one processor to cause the at least one processor to operate to:

connect to the distribution server;

connect via the ad-hoc network connection to the client;

on behalf of the client, perform registration for the application service at the distribution server, and on the basis of the registration, forward at least one message of the application service between the client and the distribution server.

18. The device according to claim 17, wherein the memory containing instructions executable by the at least one processor further causes the at least one processor to operate to:

perform forwarding of the at least one message by receiving one or more messages of the application service from the distribution server and sending said one or more messages via the ad-hoc network connection to the client.

19. The device according to claim 17, wherein the memory containing instructions executable by the at least one processor further causes the at least one processor to operate to:

perform forwarding of the at least one message by receiving one or more messages of the application service via the ad-hoc network connection from the client and sending said one or more messages to the distribution server.

20. The device according to claim 19, wherein the memory containing instructions executable by the at least one processor further causes the at least one processor to operate to:

determine a type of said one or more messages received via the ad-hoc network connection, and provide said one or more messages sent to the distribution server with a service identifier corresponding to the determined type.

21. The device according to claim 19, wherein the memory containing instructions executable by the at least one processor further causes the at least one processor to operate to:

aggregate a plurality of said messages received via the ad-hoc network connection, and send the aggregated messages to the distribution server, or filter one or more messages from a plurality of said messages received via the ad-hoc network connection, and send the filtered messages to the distribution server.

22. The device according to claim 17, wherein the memory containing instructions executable by the at least one processor further causes the at least one processor to perform the forwarding of the at least one message by:

receiving one or more messages of the application service via the ad-hoc network connection, determining a target area for distribution of said one or more messages by the distribution server, and sending said one or more messages and an indication of the determined target area to the distribution server.

23. The device according to claim 22, wherein the memory containing instructions executable by the at least one processor further causes the at least one processor to one of:

determine the target area on the basis of information in said one or more messages; or determine the target area on the basis of a geographical position of the client.

24. The device according to claim 17, wherein the memory containing instructions executable by the at least one processor further causes the at least one processor to operate to:

perform, for forwarding of the at least one message, translation between a location based addressing scheme of the ad-hoc network connection and an Internet Protocol based addressing scheme of a connection between the first interface and the distribution server.

25. The device according to claim 17, wherein the memory containing instructions executable by the at least one processor further causes the at least one processor to operate to:

determine a geographical position of the client, and indicate the determined geographical position to the distribution server.

26. The device according to claim 17,
wherein the memory containing instructions executable by the at least one processor further causes the at least one processor to operate to:
receive a message of the application service via the ad-hoc network connection, and
select between:
a) forwarding the message via the distribution server to an application server providing the application service, and
b) forwarding the message to the application server without passing through the distribution server.

27. A device for implementing a client for providing an application service through a distribution server for geographically targeted message distribution to the client, the device comprising:
a cellular interface for connecting via a first network connection to the distribution server,
an ad-hoc interface for connecting via an ad-hoc network connection to an interworking device;
at least one processor; and
a memory containing instructions executable by the at least one processor to cause the at least one processor to operate to:
via the first network connection, connect to the distribution server and perform registration for the application service at the distribution server,
via the ad-hoc network connection, connect to the interworking device which to register at the distribution server for the application service on behalf of the client via a second network connection, and
via the first network connection, send an indication to the distribution server for controlling the distribution server to pause distribution of messages of the application service via the first network connection to the client.

28. The device according to claim 27,
wherein the memory containing instructions executable by the at least one processor further causes the at least one processor to operate to:
via the first network connection, send a further indication to the distribution server for controlling the distribution server to resume distribution of messages of the application service via the first network connection to the client.

29. The device according to claim 27,
wherein the memory containing instructions executable by the at least one processor further causes the at least one processor to receive at least one message of the application service via one of:
the first network connection from the distribution server; or
the second network connection, the interworking device, and the ad-hoc network connection from the distribution server.

30. A device for implementing a distribution server for geographically targeted distribution of messages of an application service to a client, the device comprising:
at least one interface for connecting via a first network connection to a client and for connecting via a second network connection to an interworking device providing an ad-hoc network connection to the client;
at least one processor; and
a memory containing instructions executable by the at least one processor to cause the at least one processor to operate to:
via the first network connection, connect to the client and perform registration of the client for the application service,
via the second network connection, connect to the interworking device and perform registration of the interworking device for the application service on behalf of the client,
via the first network connection, receive an indication from the client, and
in response to the indication, pause distribution of messages of the application service via the first network connection to the client.

31. The device according to claim 30,
wherein the memory containing instructions executable by the at least one processor further causes the at least one processor to operate to:
via the first network connection, receive a further indication from the client, and
in response to the further indication, resume distribution of messages of the application service via the first network connection to the client.

32. The device according to claim 30,
wherein the memory containing instructions executable by the at least one processor further causes the at least one processor to receive at least one message of the application service via one of:
the first network connection to the client; or
the second network connection the interworking device and the ad-hoc network connection to the client.

33. A computer program product comprising a non-transitory computer readable storage medium storing program code to be executed by at least one processor of a device for geographically targeted distribution of messages of an application service to a client, wherein execution of the program code causes the at least one processor to perform the steps of the method according to claim 1.

34. A computer program product comprising a non-transitory computer readable storage medium storing program code to be executed by at least one processor of a device for geographically targeted distribution of messages of an application service to a client, wherein execution of the program code causes the at least one processor to perform the steps of the method according to claim 11.

35. A computer program product comprising a non-transitory computer readable storage medium storing program code to be executed by at least one processor of a device for geographically targeted distribution of messages of an application service to a client, wherein execution of the program code causes the at least one processor to perform the steps of the method according to claim 14.

* * * * *